(12) United States Patent
Snell et al.

(10) Patent No.: US 9,098,875 B2
(45) Date of Patent: Aug. 4, 2015

(54) FINANCIAL-SERVICE STRUCTURED CONTENT MANAGER

(71) Applicant: nCino, LLC, Wilmington, NC (US)

(72) Inventors: Nathan Snell, Wilmington, NC (US); Matthew Lukens, Rocky Point, NC (US); Jaco Raubenheimer, Atlanta, GA (US)

(73) Assignee: nCino, Inc., Wilmington, NC (US)

( * ) Notice: Subject to any disclaimer, the term of this patent is extended or adjusted under 35 U.S.C. 154(b) by 0 days.

(21) Appl. No.: 14/516,363

(22) Filed: Oct. 16, 2014

(65) Prior Publication Data

US 2015/0039491 A1 Feb. 5, 2015

Related U.S. Application Data

(60) Provisional application No. 62/032,239, filed on Aug. 1, 2014.

(51) Int. Cl.
*G06F 17/30* (2006.01)
*G06Q 40/02* (2012.01)

(52) U.S. Cl.
CPC ........ *G06Q 40/025* (2013.01); *G06F 17/30115* (2013.01); *G06F 17/30424* (2013.01); *G06F 17/30486* (2013.01); *G06F 17/30601* (2013.01); *G06F 17/30607* (2013.01)

(58) Field of Classification Search
CPC ................. G06Q 40/06; G06Q 40/025; G06F 17/30115; G06F 17/30607; G06F 17/30103; G06F 17/30424; G06F 17/30634; G06F 17/30601; G06F 17/30486
USPC ............................................ 707/736; 705/38
See application file for complete search history.

(56) References Cited

U.S. PATENT DOCUMENTS

| | | | |
|---|---|---|---|
| 2004/0003347 A1* | 1/2004 | Saidenberg et al. | 715/511 |
| 2005/0086176 A1* | 4/2005 | Dahlgren et al. | 705/64 |
| 2005/0203834 A1* | 9/2005 | Prieston | 705/38 |
| 2006/0206416 A1* | 9/2006 | Farias | 705/38 |
| 2008/0133391 A1* | 6/2008 | Kurian et al. | 705/35 |
| 2008/0301038 A1* | 12/2008 | Anderson et al. | 705/38 |
| 2009/0164387 A1* | 6/2009 | Armstrong et al. | 705/36 R |
| 2011/0112957 A1* | 5/2011 | Ingram et al. | 705/38 |
| 2011/0131122 A1* | 6/2011 | Griffin et al. | 705/35 |
| 2012/0011056 A1* | 1/2012 | Ward et al. | 705/38 |
| 2012/0215812 A1* | 8/2012 | Gilstrap et al. | 707/781 |
| 2012/0290467 A1* | 11/2012 | Shenkar et al. | 705/38 |
| 2013/0006845 A1* | 1/2013 | Kremen | 705/38 |
| 2014/0289098 A1* | 9/2014 | Walzak | 705/38 |

* cited by examiner

*Primary Examiner* — Thanh-Ha Dang
(74) *Attorney, Agent, or Firm* — Kilpatrick Townsend & Stockton LLP

(57) ABSTRACT

A financial-service system that manages content objects includes a chronicles platform with a chronicle associated with a loan request. A content manager determines a set of content objects to be associated with the chronicle and generates a bucket for each content object of the set of content objects. Each bucket is associated with a name and is configured to receive an associated content object. The chronicle is populated with the generated buckets. An interface that detects a user action and that thereafter receives or generates a content object, which is detected by the content manager and associated with a bucket. The content manager causes the bucket to receive the content object and presents representations of the buckets to a user. Representations of one or more buckets that have received a content object differ from representations of one or more other buckets that have not received a content object.

20 Claims, 11 Drawing Sheets

FINANCIAL-SERVICE STRUCTURED CONTENT MANAGER

CROSS-REFERENCE TO RELATED APPLICATIONS

This application is a non-provisional of and claims the benefit of and priority to U.S. Application No. 62/032,239, filed on Aug. 1, 2014.

BACKGROUND

A wide range of institutions are forced to comply with expectations, rules and standards that necessitate a high level of organization. For example, a bank is expected to reliably treat its customers and potential customers fairly. However, it is difficult to meet this objective. Each customer, account or other instance is surrounded by unique circumstances which can complicate efforts to consistently act fairly even in the most regimen of institutional efforts. A bank may find a particular customer characteristic to be extremely important in its decision with regard to that customer, but data on that characteristic may be unavailable for another customer. Additionally, within an institution, different people (e.g., employees) can be involved with different customers or accounts. This variation can lead to further inconsistency regarding implemented procedures and final results. Thus, regardless of whether an institution is attempting to apply consistent treatment to improve customer relations, to allow for internal operation reviews or to conform with external policies, the institution may struggle to implement this treatment consistency.

Further, even assessing whether consistent treatment was applied can be difficult. An institution can receive information from a range of sources. For example, different customers may be willing and/or able to provide different types of information, and different credit institutions may provide different data even in response to same requests. Employees receiving this data may further have different preferences in terms of what information to retain and how to organize the information. Thus, attempts to review histories associated with a series of, e.g., accounts can be difficult given the variation across the data associated with the accounts.

SUMMARY

In one embodiment, the present disclosure provides a method and system for standardizing stored content objects. For example, a content manager can prepopulate a storage area (e.g., associated with a loan request) to include a set of content buckets. Each content bucket can be associated with properties of an expected content object and can be associated with a name for the expected content object (e.g., "Credit Report 1"), an expected content-object type (e.g., pdf), file-size limits, task assignments to various users (e.g., Upload: User #78; Approve: Any Supervisor), and/or deadlines (e.g., Upload by Jun. 24, 2013; Approve by Jul. 1, 2013). Each content bucket can have a requirement identifier that indicates a required or desired status of the bucket (e.g., any status acceptable, filled, filled and approved, etc.).

An authorized user can then access a content object and use it to fill the content bucket. For example, an icon or description of a content file can be dragged and dropped into a representation of the content bucket. The content object can then automatically be renamed. Thus, all content objects including similar or same contents can be consistently named across storage areas. Additionally, users assigned tasks for the content object (e.g., reviewing, editing or approving tasks) can be notified of the content object's presence.

For a given storage area, a user may be informed of statuses of the content buckets (e.g., empty, filled, or approved) in a bucket-specific or summarized manner (e.g., 90% of required content buckets filled). The user can thus be informed as to which content buckets have not yet reached their required or desired status. Therefore, the content manager can automatically indicate a standardized and informative view of a status of a storage area. Further, a user can view information across storage areas. As one example, the content manager can collect all documents stored within same-type buckets. As another example, the content manager can extract and statistically summarize data from documents stored within same-type buckets. Thus, the user can be provided with high- or low-level data associated with a set of storage areas (e.g., a set of accounts).

It will be appreciated that appropriate or desired characteristics such as content-object identities, status requirements and allowable user interactions with the content objects can vary across industries. Thus, e.g., it would be desirable to allow a financial institution and an academic institution to be able to interact with a system that maintains the uniformity within an institution's or industry's use of the system but nonetheless allows the system to be appropriately customized such that, e.g., the institutions are not required to upload same content objects. Embodiments of the invention therefore allow an authorized user to define, e.g., content buckets, possible content-bucket statuses, content-bucket characteristics (e.g., a required type or required file status), content-bucket priorities (e.g., requiring a first content bucket to be filled before a second content bucket), authorities allocated to other users, automated or possible aggregations across content buckets. The user can create or adjust these definitions using, e.g., a web-based or mobile-application-based interface. These definitions can thereafter be used to tailor a system which users in a particular institution or group of institutions can interact with.

In some embodiments, a financial-service system for managing content objects is provided. A chronicles platform includes a chronicle associated with a loan request. An interface detects a user action and that thereafter receives or generates a content object. A content manager determines a set of content objects to be associated with the chronicle and generates a bucket for each content object of the set of content objects. The bucket is associated with a name and is configured to receive an associated content object. The content manager further populates the chronicle with the generated buckets, detects the received or generated content object and associates the content object with a bucket of the generated buckets. The content manager also causes the bucket to receive the content object and presents representations of the buckets to a user. Representations of one or more buckets that have received a content object differ from representations of one or more other buckets that have not received a content object.

In some embodiments, a method for managing content objects is provided. A set of content objects to be associated with a chronicle is determined. A bucket for each content object of the set of content objects is generated. The bucket includes a name and is configured to receive an associated content object. The chronicle is populated with the generated buckets. A content object generated or received based on an interaction between a user and an interface is detected. The content object is associated with a bucket of the generated buckets. The bucket is caused to receive the content object. Representations of the buckets are presented. Representations of one or more buckets that have received a content object differ from representations of one or more other buckets that have not received a content object.

In some embodiments, a non-transitory computer-readable medium having sets of instructions stored thereon is provided. The instructions, when executed by a computer, cause the computer to determine a set of content objects to be associated with a chronicle and generate a bucket for each content object of the set of content objects. The bucket includes a name and is configured to receive an associated content object. The instructions, when executed by the computer, also cause the computer to populate the chronicle with the generated buckets, detect a content object generated or received based on interaction between a user and an interface and associate the content object with a bucket of the generated buckets. The instructions, when executed by the computer, further cause the computer to cause the bucket to receive the content object and present representations of the buckets. Representations of one or more buckets that have received a content object differ from representations of one or more other buckets that have not received a content object.

In some embodiments of the present invention, financial objects are used as a basis for generating an interconnect web. The web can identify relationships between individual parties (e.g., individuals and/or businesses) based on financial objects. For example, a single loan can serve as the basis for relationship between three parties: of borrower, a guarantor, and an issuer. The web can indicate that an individual is serving as a guarantor and is related (e.g., via a familial relationship) to the borrower. Many financial objects can be tracked, such that the web can serve as a complete picture as to a party's financial standing. In some instances, relationships can represent risk, as a particular party may be associated with a financially insecure party. In some instances, relationships can represent strengths. For example, one party may be related to a very financially sound business or individual. The web can therefore distinguish the risk of being a guarantor to a loan based on characteristics and/or relationships of the borrower.

The web can be continually maintained to appropriately add, remove or modify connections between parties and/or financial objects. Further, characteristics of parties and/or financial objects can be routinely updated (e.g., to reflect recent payment histories, debt ratios and/or job statuses). Further yet, in addition to detecting relationships existing via financial objects, direct inter-party relationships can further be identified based on, e.g., user input and/or financial-object documentation (e.g., identifying familial relationships or occupational relationships).

An interface can allow a reviewer to identify a first party. The first party can be looked up within the web, and financial objects and/or other parties related to the first party can be identified. A representation of these relationships can be presented to the reviewer. This representation can be interactive, such that the reviewer can request additional detail about one of the related parties and/or financial objects. The reviewer can thus explore financial circumstances surrounding a party of interest.

A web can thus serve to represent how various entities are related, such that a reviewer can appreciate how a risk associated with one entity may affect a risk of another. In some embodiments, an aggregate web element can be generated to reflect a combined risk of multiple entities. A rule or user input can be used to determine which entities are to be reflected in an aggregation. For example, a household aggregation risk can indicate that all adult members living in an address (or an individual and any spouse), along with any businesses for which the adult(s) hold any of a list of specified titles (e.g., owner or CEO), are to be included in a household element. A risk score can be generated for the element that then reflects a risk for the adult(s) and any identified business(es), and the score can be used to evaluate a loan request for an entity represented in the household element.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
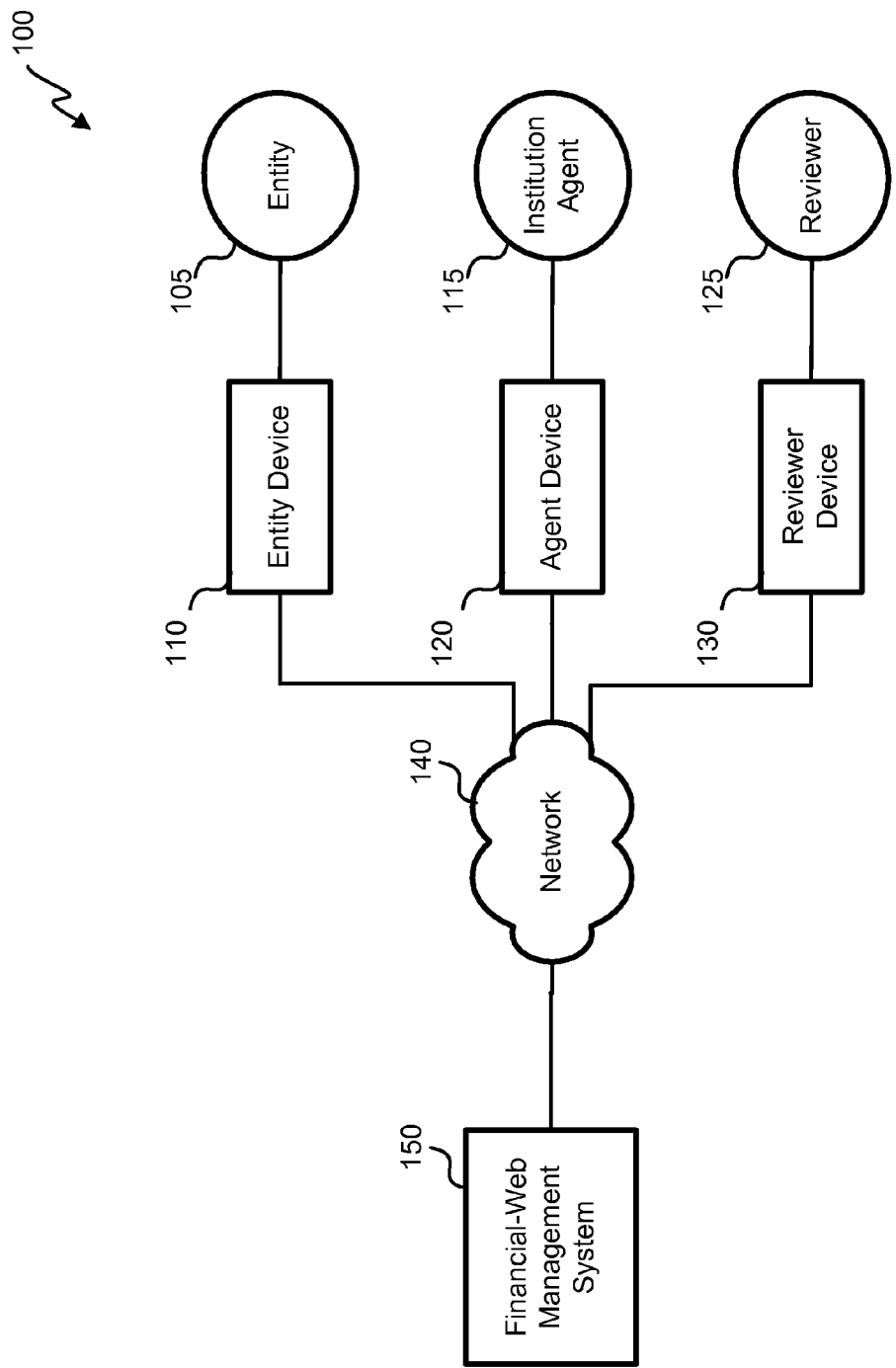
FIG. 1 depicts a block diagram of an embodiment of a financial-web interaction system.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

A variety of financial opportunities are made available to members of the public. For example, an individual may apply for an auto loan, a mortgage, and/or an education loan. Financial institutions must assess an individual's financial situation in order to determine whether to offer a financial opportunity at all and/or terms of the opportunity. Typically, when individuals are interested in a loan, they must fill out substantial paperwork. Institutions attempt to ask all pertinent information within this paperwork to characterize individuals' financial situations. Even so, pertinent details can be overlooked. Thus, institutions frequently have incomplete data when making decisions.

A financial interconnect web can be dynamically generated and updated based on detection of manual input and/or documentation pertaining to existing and/or potential financial objects. The web can identify a particular party's association with one or more financial objects, such as loans, credit cards, investment accounts, etc. Further, the web can identify the party's relationship with other parties. Some relationships can be direct, such as familial or occupational relationships (e.g., that exist irrespective of existence of a financial object). Some relationships can be indirect via financial object. For example, a first party can be related to a second party when the two parties share a joint account. A reviewer can look up a particular party and can view information pertaining to that party's relationships. The reviewer can then assess the risk associated with objects and/or parties related to a party of interest and use this assessment to estimate a risk of the particular party.

Some embodiments relate to facilitating evaluation of financial objects (e.g., loan requests) via aggregated entity assessments. A set of financial object records can be accessed. Each financial object record in the set of financial object records can characterize a financial object. The financial object can include or represent a financial responsibility, asset, or an account. For example, the financial object can include a loan, loan request, bank account, credit card account, investment account, or request for a credit card. The financial object record can characterize the financial object by specifying, for example, a balance, an amount due, a type of financial object (e.g., an account type, whether it is a loan, whether it is a personal or commercial loan, etc.), an interest rate, a term, a payment characteristic (e.g., date of last payment or deposit, it amount of last payment or deposit). For each financial object record in the set of financial object records, a financial liability associated with the characterized financial object be identified (e.g., based on data in the record). The financial liability may include, for example, an amount due, balance, outstanding loan amount, or credit limit.

For a first financial object record characterized by a first financial object record in the set of financial object records, a first entity that is financially responsible for a first financial liability associated with the first financial object. Similarly, for a second financial object record characterized by a second financial object record in the set of financial object records, a second entity that is financially responsible for a second financial liability associated with the second financial object. For example, the first entity and/or second entity can include a borrower or account owner. The first entity and/or second entity can be identified based on, for example, the corresponding financial object record (e.g., by extracting a name or social security number or the first entity).

A set of relationships is identified, where each relationship in the set of relationships relates two entities in a plurality of entities (the plurality of entities including the first and second entities) and is of a relationship type that is indicative of a type of business or familial relationship between the related two entities. For example, a relationship can indicate that two entities (e.g., the first and second entities) are spouses, significant others, co-owners of a business, or living at a same address. As another example, a relationship can indicate that a first entity owns, manages or holds another title (e.g., CEO, CFO, or President) for a second entity (e.g., the second entity being a business, organization or institution).

An aggregation protocol can be identified that specifies one or more types of relationships that support entity aggregation. For example, a household aggregation protocol can indicate that entities are to contribute to an aggregated entity when they are related via a spousal and/or business-ownership relationship. As another example, a business-inclusive aggregation protocol can indicate that entities are to contribute to an aggregated entity when a person has a role in a business that causes the person to have at least partial financial responsibility for the business. An aggregation protocol can be predefined, learned (e.g., based on which relationships are indicative of related risk) and/or defined at least in part by a reviewer.

It can be identified that the first entity and the second entity are related to each other via a type of relationship of the specified one or more types of relationships that support entity aggregation. An aggregate entity element that represents a combination of the first entity and the second entity (e.g., and, in some instances, one or more other entities that are related to the first or second entity via a relationship of a type of the specified one or more types) can then be generated.

A financial variable for the aggregate entity element can be determined based on the first financial liability and the second financial liability. For example, the first financial liability and second financial liability can be summed or averaged (e.g., in a weighted or unweighted manner). The financial variable can, in some instances, depend on additional parameters, such as one or more asset values and/or net worths associated with the first and second entities.

A query input corresponding to a request for data pertaining to the first entity can be received (e.g., from an authorized reviewer). For example, the query input can include a name or numeric identifier (e.g., social security number or business identifier) of the entity. The query input can be received, e.g., via a webpage or app. In response to the query input, a presentation of the financial variable for the aggregate entity element can be facilitated. The presentation may or may not include a financial variable (e.g., based on the first financial liability) for the first entity. The presentation may include identifiers of each entity contributing to the aggregate entity. The presentation may further include an option for the reviewer to adjust which entities are to contribute to the aggregate entity.

Some embodiments relate to systems and methods for method for detecting interrelationships between entities and financial objects. Information pertaining to each of a set of financial objects can be accessed. The information can be included in a financial object record for the financial object. A financial object in the set of financial objects can include or represent a financial responsibility, asset, or an account. For example, the financial object can include a loan, loan request, bank account, credit card account, investment account, or request for a credit card. The information can include, for example, a balance, an amount due, a type of financial object (e.g., an account type, whether it is a loan, whether it is a personal or commercial loan, etc.), an interest rate, a term, a payment characteristic (e.g., date of last payment or deposit, or amount of last payment or deposit). For each financial object record in the set of financial object records, a financial liability associated with the characterized financial object be identified (e.g., based on data in the record). The financial liability may include, for example, an amount due, balance, outstanding loan amount, or credit limit.

For each financial object in the set of financial objects, one or more entities (e.g., a person, group of people, institution, business, company or organization) having a relationship to the financial object are identified based on the accessed information. For example, an entity can be (for example) an owner, account holder, guarantor, issuing agent, financially responsible party, lender or underwriter. The entity can be determined, for example, based on a financial object record (e.g., by extracting a name or field value). At least one of the one or more entities can have an actual financial responsibility as a result of the relationship (e.g., can be a loan recipient) or can have an potential financial responsibility (e.g., can be a guarantor). At least one entity can have a relationship to multiple financial objects (e.g., be a recipient of two loans; be a recipient of one loan and owner of one credit card; or be a recipient of one loan and owner of a checking account).

A multi-party interrelationship web is generated. The web includes an identification of each financial object in the set of financial objects. It will be appreciated that, in some instances, one or more other financial objects (e.g., that are not included in the set) are not included in the web. The identification can include or represent an identifier of the object, an identification of a type of the object and/or one or more other characteristics of the object (e.g., an amount due). In some instances, each financial object is represented by a shape or block (e.g., and/or text). The web also includes an identification, for each financial object in the set of financial objects, of each of the one or more entities having a relationship to the financial object. The identification of an entity can include, for example, an identifier of the entity (e.g., name or identifying number), an identification of a type of the entity (e.g., person, business or organization) and/or one or more other characteristics of the object (e.g., age, income, profession and/or net worth). In some instances, each entity is represented by a shape or block (e.g., and/or text). The web also includes an identification, for each financial object in the set of financial objects, of the relationship between each of the one or more entities and the financial object. The identification can include, for example, a connection (e.g., a line) between a representation of each of the one or more entities and a representation of the financial object or a table element that links an identifier of an entity of the one or more entities with an identifier of the financial object. In some instances, one or more characteristics of the relationship (e.g., a type and/or duration of the relationship) is also identified.

A query input corresponding to an identification of a first entity can be received. For example, the query input can be received from a reviewer device and can correspond to input provided via a webpage or app. The identification of the first entity can include, for example, a name, social security number, business identification number, birthday or other identifier for the first entity. Using the multi-party interrelationship web, a second entity related to the first entity via one or more financial objects in the set of financial objects is identified. For example, the first and second entities may be co-borrowers of a loan; or the first entity may be a guarantor of a loan held by the second entity (or the reverse). Presentation of an indication that the first entity and the second entity are related via the one or more financial objects can then be facilitated. For example, a presentation can be presented or transmitted for presentation, or data to be included in the presentation can be transmitted (e.g., to a reviewer device). The presentation can include a graphical representation of at least part of the multi-party interrelationship web (e.g., a portion that includes a representation of each of the first and second entities and/or each of the one or more financial objects).

Referring first to FIG. 1, a block diagram of an embodiment of a financial-web interaction system 100 is shown. An entity 105 (also referred to as a party), an institution agent 115 and a reviewer 125 can interact with a financial-web management system 150 via respective devices 110, 120 and 130 and a network 140, such as the Internet, a wide area network (WAN), local area network (LAN) or other backbone. In some embodiments, financial-web management system 150 is made available to one or more of entities 105, institution agents 115 and/or reviewers 115 via an app (that can be downloaded to and executed on a portable electronic device) or a website. It will be understood that, although only one entity 105, entity device 115, institution agent 115, agent device 120, reviewer 125 and reviewer device 130 are shown, system 100 can include multiple entities 105, entity devices 110, institution agents 115, agent devices 120, reviewers 125, and/or reviewer devices 130.

Entities 105 can include, e.g., an individual person, a collection of people, a business and/or an organization. An entity can include one that has or is capable of having financial responsibility. For example, an entity can include a party that is or that could be potentially be a borrower of a loan, a requestor of a loan application, a guarantor for a loan or loan application, an owner of an account (e.g., a checking, savings or mutual fund account), a stock holder, a credit card holder and/or a customer of a financial institution.

Institution agents 115 can include individuals who can represent an institution, who are employees of an institution, who interact with entities 105, who manage financial objects and/or who are authorized to provide input pertaining to a financial object (e.g., on behalf of an institution providing a financial service). Thus, in some instances, an institution agent 115 can include a party that has or is authorized to provide input pertaining to an existing or potential financial service, such as a loan or management of an account (e.g., checking, savings, mutual-fund, stock or credit card account). For example, an institution agent 115 can include a loan officer at a bank.

Reviewers 125 can include parties who are authorized to investigate details of one or more entities 105 (e.g., to determine whether to extend an offer to an entity for a financial object and/or to select terms for such an offer) via a financial web. For example, a reviewer 125 can include a party authorized to receive a risk score for an entity 105 that is generated at least in part based on a financial web. In one instance, a reviewer 125 is also an institution agent 115.

An entity 105 and/or an institution agent 115 can interact with financial-web management system 150 or another system to generate a financial object to be associated with a particular entity 105. The object can include intangible financial responsibility or account (e.g., a bank account, credit card account, loan, an investment account, etc.) and/or a request for a financial service (e.g., a request for a loan or credit card). In one instance, an entity 105 or institution agent 115 can enter information about entity 105 and that information is used to determine whether to offer an object to the entity. Depending on the embodiment, an object can be created when one or more parties are engaged in a consideration of whether to create a financial relationship (or have reached a threshold stage or documentation level in the consideration), or the object can be created when the financial relationship is actually created.

For example, an object may represent that an entity is being considered for a loan, or objects generation may be withheld until the loan is provided. Information associated with the object can identify details such as an interest rate, a term duration, a restriction, an object type, an associated institution, etc. In one instance, an entity 105 or institution agent 115 can enter information identifying an existing object, such as in identifying code and or one or more details (e.g., an object type, and associated entity, an interest rate, etc.). In one instance, financial-web management system 150 automatically detects objects, objects' associations with entities and other object details (e.g., based on information in a data store).

Thus, using one or more techniques, financial-web management system 150 can access information about objects and their associations with entities. The information can include details about an existing object (e.g., a current interest rate or balance), historical details (e.g., a frequency of overdraft or late payments), application details (e.g., a previous job or salary), etc. As described in greater detail herein, such information can be used to not only associate individual entities with one or more objects, but to further associate individual entities with other entities. Entity-to-entity associations can be indirect, such that an association is formed (in some or all situations) when each of two entities are associated with a same object. Thus, the relationship revolves around the object. Entity-to-entity associations can alternatively or additionally be direct. For example, a loan application can indicate that a first entity is a family member of a second entity, or a bank account document can indicate that a first entity is an employee of a second entity. Notably, even though object documentation can identify a relationship, the relationship is a direct relationship when the relationship does not hinge upon existence of the object.

Using the entity-to-entity and/or entity-to-object associations, financial-web management system 150 can build a financial web that identifies a particular entity's association with objects or other entities. Financial-web management system 150 can use the web to process queries from reviewers 125 to identify some or all of a particular entity's associations to the reviewer. The identified associations can be limited by an association degree (e.g., to restrict presented associations to those separated by two or fewer objects or entities), a query limitation and/or an authorization of a particular reviewer. The associations can be presented graphically (e.g., using a pictorial representation of part of the web centered on an entity of interest), textually, using a table, etc.

Figure 2:
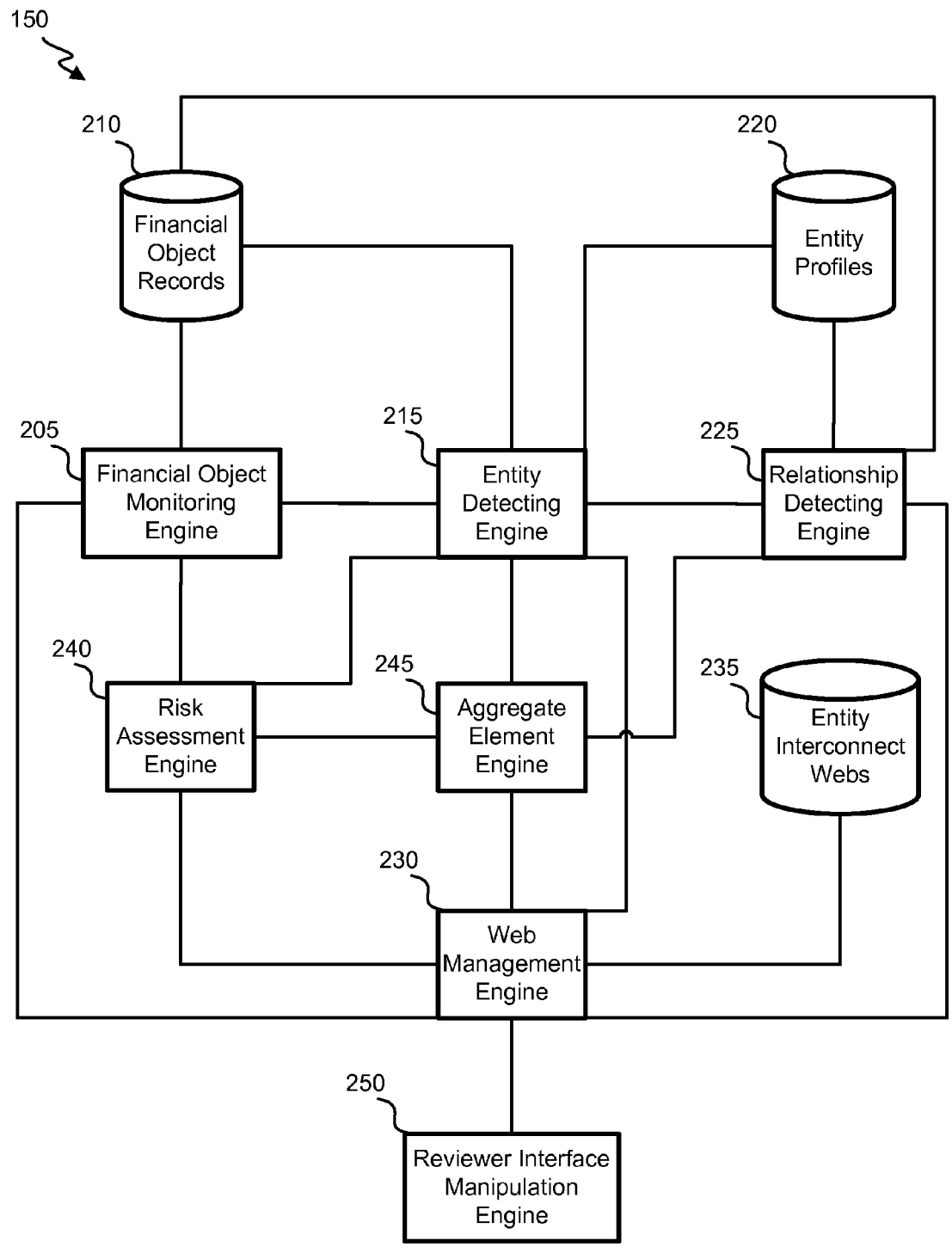
FIG. 2 depicts a block diagram of an embodiment of a financial-web management system.

Referring next to FIG. 2, a block diagram of an embodiment of financial-web management system 150 is shown. In some instances, at least part of financial-web management system 150 is present on a device, such as an agent device 120. In some instances, financial-web management system 150 can be in the cloud and/or distributed (e.g., across devices and/or the cloud).

Financial-web management system 150 includes a financial object monitoring engine 205 that detects new and/or changed data pertaining to a financial object. In some instances, the detection includes detecting a new or changed financial object record (e.g., received by financial object monitoring engine and/or stored in a financial object record data store 210). A financial object record can include one or more files pertaining to, for example, a loan request, an existing loan, an extended credit, an account, a balance, a payment (or missed payment). For example, a financial object record can include documentation of a particular party having applied for a mortgage loan and can specify an amount, down-payment, collateral, term, and interest rate associated with the requested loan and can further specify qualification details, such as an applicant's income, employer, occupation, asset amounts, identified liabilities and credit scores. Data in a financial object record can be, for example, provided by an entity (e.g., borrower, applicant or account holder), provided by an institution agent (e.g., loan officer or underwriter), and/or automatically detected (e.g., determining whether a payment was received or receiving a response to a request identifying a credit score).

In some instances, financial object monitoring engine 205 can include a detecting component that parses a record and/or detects data corresponding to a particular field and/or type of data. For example, financial object monitoring engine 205 can automatically detect a current outstanding balance of a loan (e.g., based on an identification of the balance and/or payment history) and/or can detect a type of decision provided for a loan request decision field.

An entity detecting engine 215 can identify each of one or more entities involved in a financial object (e.g., via a record for the financial object and/or input from an entity or institution agent). For example, entity detecting engine 215 can identify an applicant, borrower, guarantor, and/or financial institution. In some instances, the identification can include detecting information associated with an entity (e.g., detecting a borrower's social security number), and using the information to identify an entity profile stored in an entity profile data store 220. In some instances, entity detecting engine 215 can further or alternatively identify additional information about the entity based on data associated with a financial object. For example, entity detecting engine 215 can identify a person's occupation, employer, income, age, social security number, address, phone number and/or email address. Such data can be, for example, independent of financial objects and can be used to generate and/or update a profile for the entity.

A relationship detecting engine 225 can define relationships that identify how particular entities are related to a financial object and/or to each other (e.g., vi a financial object record and/or input from an entity or institution agent). For example, a relationship engine 225 can determine that a financial object record identifies two parties as being spouses, and can then define a relationship as being between the two parties and being a married or spousal relationship. As another example, relationship engine 225 can detect that a particular party is serving as a guarantor on a loan and can then define a relationship between the party and the loan as a guarantor relationship. Relationship detecting engine 225 can define a relationship by, for example, determining an identifier for each entity and/or object involved in the relationship and (in some instances) identifying a type of relationship. For example, relationship detecting engine 225 can identify a credit card account owner type of relationship as existing between a first party associated with a particular social security number and an account number of the credit card.

Depending on the embodiment, relationships can be stored as part of one or more entity profiles and/or financial object records and/or separately. For example, a profile for an entity may identify that the entity is related to one or more other entities and/or financial objects (e.g., by including an identifier of the other entities and/or objects) and can identify a type of relationship (e.g., by including an identifier of the relationship type). As another example, a relationship array can identify which objects and/or entities are connected via a relationship (e.g., a direct relationship) and/or a relationship type. As yet another example, a relationship table can include a single element (e.g., row or column) for each relationship and can identify the entities and/or object involved in the relationship and/or a type of relationship. As yet another example, a separate relationship structure can be maintained for each type of relationship, and the structure can identify the related parties.

A web management engine 230 can use data pertaining to financial objects (e.g., detected by financial object monitoring engine 205), data pertaining to entities (e.g., detected by entity detecting engine 215) and/or data pertaining to relationships (e.g., detected by relationship detecting engine 225) to generate and/or update an entity-interconnect financial web, which can be stored in an entity interconnect web data store 235. A web can include a representation for each of one or more entities and/or financial objects and can establish links between entities and/or entities and objects that represent relationships. The web can be structured in a manner to reflect indirect relationships. For example, a web can reflect that a first person is associated with a particular loan due to the first person being married to the borrower of the loan.

Web management engine 230 can, in some instances, generate a visual representation of part or all of a web. The representation may be centered on a particular entity or object of interest and/or may be interactive (e.g., such that a reviewer can select a representation of a party, object or relationship and thereafter receive additional corresponding detail).

A risk assessment engine 240 can generate a risk variable for a given entity or financial object. The risk variable can be generated in accordance with a defined formula (e.g., a fixed formula, one provided by a reviewer or institution agent, or one learned based on monitored payment data). The risk variable can depend on information associated with the particular entity or object, such as an entity's income, credit score and age, or an object's balance and duration.

The risk variable can also depend on relationships between the entity or object and one or more other entities and/or objects, which (in some instances) can include indirect relationships (e.g., via an intermediate object or entity). In some instances, the risk variable can depend on a number, types and/or degrees of relationships between a first entity and one or more second entities and/or objects and can further or alternatively depend on data associated with the second entities and/or objects. For example, a risk variable may be differentially affected if Entity A is married to Entity B, who is guaranteeing a loan for Entity C as opposed to if Entity A is married to Entity B, who is a borrower of a loan being guaranteed by Entity C. A risk variable can include, for example, a numeric score or a categorization.

In various circumstances, it can be advantageous to generate a risk variable for a combination of entities. For example, assessing a financial risk of a household or collection of co-owners of a business can be prudent when making a decision pertaining to a financial-service request submitted by a household member or representative of the business.

An aggregate element engine 245 can thus define one or more aggregate elements. The defining can include identifying entities to be represented in the aggregate element (e.g., including an identifier for each entity), and, in some instances, identifying a weight of each of one or more entities. For example, in a partnership aggregate element, each partner in the partnership may be represented and associated with a weight equal to their percentage ownership of the partnership. In some instances, defining an aggregate element further results in or facilitates generation of a new relationship between a represented entity and the aggregate entity. Such relationship can be reflected, for example, in a profile of the represented entity, in a relationship data structure and/or in an aggregate element data structure.

Aggregate element engine 245 can use one or more aggregation rules to determine which entities to represent in an aggregate element. An aggregation rule can be fixed, defined (in its entirety or in part) by an institution agent or reviewer and/or learned. (e.g., to include entities in a manner that leads to a risk variable with a high correlation with payment patterns) In some instances, an aggregation rule can depend on a type of financial service request being considered and/or a type of entity being evaluated. The aggregation rule can specify types of relationships and/or degrees of relationships which are to trigger inclusion of the related entities in an aggregate element. The aggregation rule can, in some instances, include additional aggregation conditions and/or exceptions. For example, an aggregation rule can include representing two parties in an aggregate element if they are connected by a "married" relationship, so long as there is no indication that they are separated. As another example, an aggregation rule can include that all adults living at a single address are to be included in a household aggregate element unless all adults are in college.

Aggregate element engine 245 can identify which entities are to be aggregated in accordance with a rule based on a stored entity profiles (identifying relationship information), a relationship structure and/or a financial web. For example, aggregate element engine 245 can search for relationships of a type identified in an aggregate rule (e.g., and collect any other pertinent data to determine whether and/or how an aggregation is to occur).

Risk assessment engine 240 can identify a risk variable for an aggregate element using, for example, data pertaining to each entity represented in the aggregate element and/or data pertaining to each financial object related to (e.g., directly related or related in a specified manner) a represented entity. In some instances, a risk variable for an aggregate element is determined based on a risk variable associated with each represented entity. For example, the entities' risk variables can be averaged (e.g., in a weighted or unweighted manner).

In some instances, web management engine 230 incorporates one or more risk assessment variables into a financial web and/or representation thereof. For example, a color of a representation of an entity, financial object or aggregate element can be selected based on a corresponding risk variable. As another example, a risk variable value can be presented upon a selection of a particular entity or object.

It will be appreciated that various components of financial-web management system 150 can repeatedly monitor for and/or detect new or changed data and can update respective entity profiles, a relationship data structure, an aggregate element data structure and/or entity interconnect financial web.

Financial web management system 150 can include a reviewer interface manipulation engine 250 that can facilitate the generation and/or modification a reviewer interface and/or can detect reviewer input provided via the interface. Reviewer interface manipulation engine 250 can, for example, detect input (e.g., received locally or remotely) identifying an entity or financial object. Reviewer interface manipulation engine 250 can then convey an identifier of the entity or object to web management engine 230, which can generate or access an entity interconnect financial web.

Web management engine 230 can generate a representation of part or all of the web (e.g., a portion of the web extending up to a defined degree of separation from the identified entity or object). The representation can identify relationships between entities and/or between entities and financial objects. Reviewer interface manipulation engine 250 can present the representation or transmit the representation (e.g., to another device, to be presented as part of a webpage or app page and/or as part of an email).

The representation can be dynamic, in that a reviewer can provide inputs that cause a modification as to which portion of the web is represented in a presentation and/or a degree of detail that is presented. For example, a reviewer can enter an input that causes a view to zoom in or out, thereby showing fewer or more connections between entities and/or between entities and objects. As another example, a reviewer can double click on or mouse over a representation of an entity and additional detail can be presented (e.g., on top of the web representation or in place of some or all of the web representation) about the entity. In some instances, web management engine 230 and reviewer interface manipulation engine 250 function cooperatively to produce the dynamic effects of a representation of the financial web.

Figure 3:
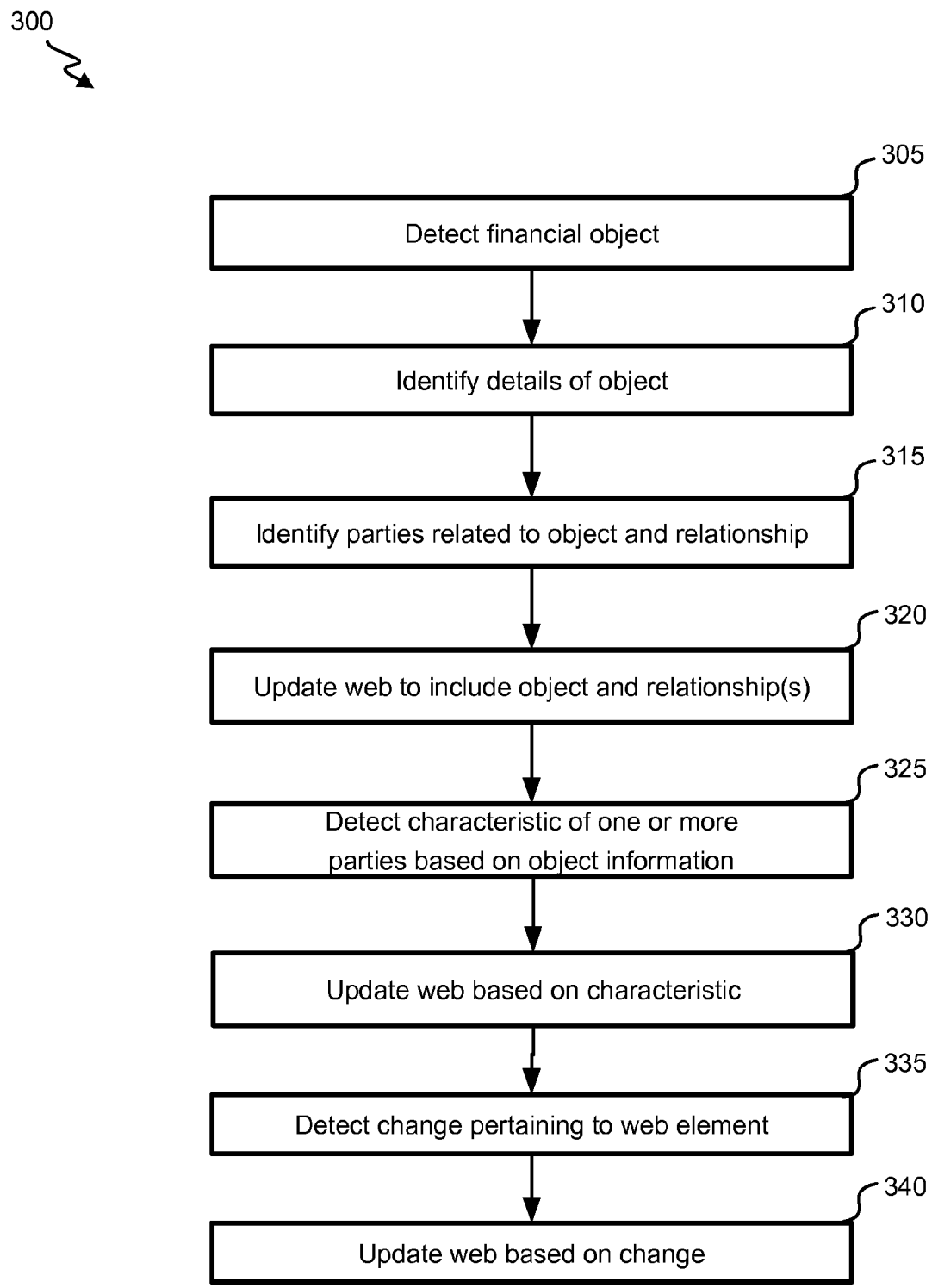
FIG. 3 illustrates a flowchart of an embodiment of a process for maintaining a financial interconnect web.

FIG. 3 illustrates a flowchart of an embodiment of a process 300 for maintaining a financial interconnect web. Part or all of process 300 can be performed, for example, at an agent device, reviewer device or in the cloud.

Process 300 begins at block 305, where a financial object is detected. The financial object can be detected based on information entered by an entity or institution agent. For example, an individual can submit information as part of an application process, an institution agent can submit information on behalf of an individual as part of an application process, an institution agent can engage in review of application, and/or an institution agent or individual can identify a decision pertaining to the application (e.g., an approval, rejection and/or terms). Thus, for example, an object can be created as part of an application process and/or once a financial relationship is established.

A block 310, one or more details of the detected object are identified. The details can include, for example, a primary entity associated with the object (e.g., one or more people or companies), such as a borrower or account owner. The details can include one or more other entities associated with the object, such as a lender, beneficiary, guarantor, investment company, credit card company, etc. The details can include a financial characteristic, such as an initial or current balance, an interest rate, a type of interest rate, a term, and/or an investment type (e.g., general allocation to stocks, mutual funds, or bonds; or allocation to specific stocks, mutual funds or bonds). The details can include historical events, such as a creation date; past payment dates; past payment amounts; a previous quantity of defaults, a number and/or amount of overdrafts or late payments; previous dates of defaults, dates of overdrafts or late payments; previous account changes (e.g., lender transfers, diversification changes and/or auto-payment settings); etc.

The details can be detected based on electronic documents (e.g., received from another device, generated based on input and/or device communications, and/or included in a financial object record) pertaining to the object or electronic data for an account. For example, system 150 can detect that the new loan application has been received. System 150 can then scan entered information or other documentation to identify corresponding details. In one instance, an institution agent or an entity is prompted to enter specific details for an object. For example, a bank employee can indicate that a loan application is under consideration, and system 150 can request particular details about the applicant from the employee. In one instance, details can be determined based on which device or user provided a document or input (e.g., data field values, a review decision, an authorization, or an electronic signature or acceptance).

Based on the details, one or more parties (also referred to herein as one or more entities) related to the object can be identified at block 315. A party can include, e.g. an account holder, a lender, a borrower, an issuer, an investor, and investee, an owner, a manager, a custodian, or a guarantor. A type of relationship between each of the identified parties and the object can further be determined. For example, it can be determined whether a party, with respect to the financial object, has a role of an applicant, borrower, reviewer, loan officer, lending institution, guarantor, account holder, loan issuer or underwriter.

In some instances, where multiple parties are related to a single object, a relationship between the two parties can be identified. This relationship can be indirect relationship, which exists due to each party's relationship with the object, or direct relationship, which exists independent of the object's existence.

At block 320, a financial-interconnect web can be generated or updated to include a representation of the detected object and an indication that the object is related to the one or more parties identified at block 315 (e.g., and an identification of a type of the relationship(s)).

In one instance, a web includes a plurality of elements. Each element can represent the object or entity. Each element can be associated with details that, at least in part, describe the object or entity. For example, for an object element, the details can identify the type of object, a status of the object (e.g., in review, approved, existing, paid off, terminated, expired, etc.), and/or terms of the object. For an element representing an individual, the details can identify the individual's name, age, profession and/or salary. For an element representing the company, the details can include the company's name, income and/or debt.

The web can further include a plurality of connections, where each connection connects multiple (e.g., two) elements. In one instance, each of one or more connections is also associated with details. These details can indicate, for example, a type of relationship (e.g., a type of familial relationship, a type of professional relationship, or an object-based relationship) and/or in actual or estimated duration of the relationship. For example, a connection can indicate that a person is a primary account holder for a particular account, or that the company is an issuer of a loan. It will be appreciated that a first web element may be connected to a second web element via multiple connections to express different types of relationships.

As noted, an object can be used to detect information that can relate multiple parties to each other. For example, a loan document that indicates that the first party is a guarantor for a loan issued to a second party can provide a basis for relating the first and second parties. The relationship is current and accurate so long as the loan exists. However, information related to objects or other information (e.g., obtained via manual input from an entity or institution agent) can also serve to identify object-independent data.

At block 325, a characteristic of each of one or more parties is detected based on information for an object in the web. For example, documentation pertaining to an account or application for an account can identify an account holder's or applicant's: name, age, occupation, employer, education level, profession/industry, salary/income, debt, assets, and/or spending habits. As another example, documentation can identify a relationship (e.g., an object-independent relationship) between an account holder or applicant and another party. Documentation for joint checking account or investment account could indicate that two parties are married, or documentation for a corporate account can identify officers of a company.

At block 330, the web is updated to reflect the detected characteristic. Such updating can include updating information associated with one or more elements in the web, updating information associated with one or more connections in the web, adding an element, adding a connection, removing an element (e.g., to reflect dissolution of a company), and/or removing the connection (e.g., to reflect a divorce or employment change).

In one instance, multiple data structures are used to maintain a web. For example, a separate data structure can be used to track data pertaining to each of: entities, financial objects and/or connections. The data structure can include data from financial object record data store 210 and/or entity profile data store 220. Each data structure can include, e.g., a folder, a table, an array, etc. The element data structure can include units, where each unit corresponds to an object or entity. Each unit can include characteristics of the corresponding object or entity. A connection data structure can include units as well, where each unit corresponds to a connection between web elements. Thus, each unit can identify two or more objects, two or more entities and/or an object and an entity. In some instances, each connection unit further includes characteristics of the connection (e.g., indicating a type of relationship, duration of a relationship, basis for having identified a relationship, and/or confidence in an existence of a relationship). Connection units may be automatically added, modified or removed based on other information, such as object information. Thus, for example, if an entity or institution agent enters information identifying a new loan object and identifying roles of various parties, connections may automatically be generated between the parties and the loan.

In some instances, indirect or high-order connections are automatically added, modified or removed. For example, when a joint checking account is added, this can cause a "joint-account" connection to be generated between the two account holders. As another example, if Party 1 is a sister of Party 2, who is a husband of Party 3, a "sister-in-law" connection may be added between Parties 1 and 3. As yet another example, if Party 1 is a guarantor for Party 2's loan, and Party 1 is a CFO for Company 1, a "guarantor's employer" connection may be added between Party 2 and Company 1. It will be appreciated that, while these examples identify connections with functional names, connections may be more generally used (e.g., to have no name or to be classified based on how many elements and/or which types of elements separate the connected elements).

At block 335, a change pertaining to an element in the web is detected. A change can include a changed or new object characteristic, such as an investment type, an account type, a beneficiary, a signatory authority, etc. A change can include a changed or new entity characteristic, such as a profession, salary, marital status, state of residence, etc. A change can include a change in a dynamic feature, such as a current interest rate or an amount due. Detecting a change can include detecting an event (e.g., detection of a payment or missed payment, dividend receipt, deposit, withdrawal, etc.). Thus, in some instances, the change is indicative of an affirmative action, while in other instances, the change is indicative of a passive evolution of the object. Accordingly, each of one more or objects can be routinely monitored for a change or only monitored on detecting an event of interest. Further, in some instances, detecting a change can include processing manual input (e.g., to identify a change in occupation), while in some instances, detecting a change includes automatically processing electronic documents.

At block 340, the web is updated based on a change. For example, a detail of an object can be updated to reflect the current balance to or to update of historical payment summary. Updating the web can include updating one or more web structures, such as a connection or element structure. Updating the web can include updating the web to reflect both the detected change and, in some instances, updating the web to reflect secondary effects of the detected change. For example, if it is detected that a loan is paid off, updating the web can include removing a guarantor connection, an issuer connection and/or a loan-owner relationship associated with the loan. The detection can also cause an element characteristic to be adjusted. For example, detecting a deposit can cause a net worth of an account holder to be adjusted It will be appreciated that one or more of the blocks in process 300 can be periodically or routinely repeated so as to keep information represented in a web current.

Figure 4:
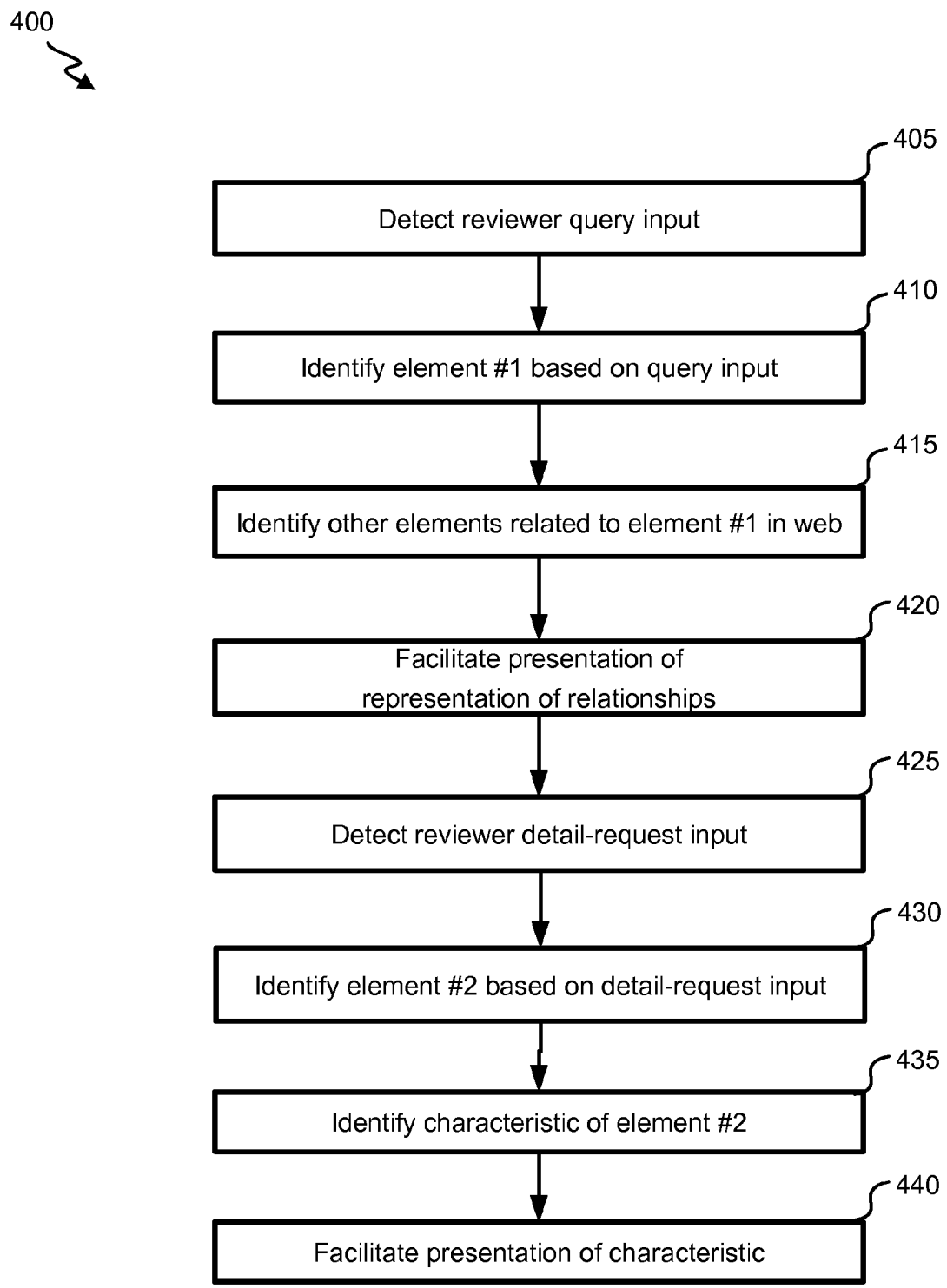
FIG. 4 illustrates a flowchart of an embodiment of a process for dynamically updating a representation of a financial interconnect web based on input.

FIG. 4 illustrates a flowchart of an embodiment of a process 400 for representing a financial interconnect web based on input. Part or all of process 400 can be performed, for example, at an agent device, reviewer device or in the cloud.

Process 400 begins at block 405, where a query input entered by a reviewer is detected. A query interface can be made available to a reviewer, such that the reviewer can enter a name or other identifier of an entity or of an object. The interface can be made available via, e.g., a webpage or app page. The query input can include, for example, text (e.g., a name), one or more words, a number (e.g., a social security number), an alphanumeric code (e.g., an identifier of a loan) and/or a selection amongst a set of presented options. The query input can include information about and/or an identifier of an entity and/or financial object.

At block 410, a first element in a financial interconnect web is identified based on the query input. For example, an element representing an entity with a name, social security number, address, and/or phone number that matches corresponding information in the input can be identified. Identifying a match can include identifying an exact match, a closest match and/or one or more above threshold matches. In one instance, identifiers of multiple elements (e.g., with above-threshold match scores) are presented to reviewer, such that the reviewer can select an element of interest.

In some instances, an authorization process is initiated while or after identifying the first element. Login information, a computing system being used by a reviewer, a location of a computing system being used by reviewer, etc. can be used to determine what information is to be made available to a particular reviewer. For example, an authorization constraint can indicate that reviewers are only to have access to information built from data provided by a local bank. In this instance, a system identifier or an identifier of the location of the system can be used to infer the bank associated with a reviewer, and access can be accordingly restricted. As another example, an authorization constraint can indicate that only high-level officers are to have access to multi-branch data. Login information can indicate whether a given reviewer is a high-level officer, and access can be accordingly granted or restricted.

At block 415, one or more other elements that are related to the first element in the web are identified. These other elements can include objects and/or entities. In some instances, the identification is limited based on a degree of separation. Such a limitation can be routinely applied or applied based on such a restriction in the query input. For example, the input can indicate that the reviewer is requesting that a result identify $1^{st}$- and $2^{nd}$-order related entities (such that each identified entity is not separated from the first entity by more than one other entity). Additional limitations can also or alternatively be utilized. For example, elements identified can be restricted to those authorized to be presented to the reviewer or to those of a type (e.g., an object type or entity relationship built from objects of a given type) as specified by the reviewer.

At block 420, a presentation of a representation of the relationships can be facilitated. For example, the representation can be locally presented or transmitted to another device (e.g., a reviewer device) to be presented via, for example, a webpage, app page, email or SMS message.

The representation can identify related elements (objects and/or entities) and, in some instances, can identify details indicating how the first element is related to the related elements. The representation can, in some instances, reflect or identify a risk variable associated with one or more entities (e.g., each entity represented in a presentation, an entity corresponding to element #1, or each entity within a defined degree of separation from element #1). For example, a numeric risk variable can be presented in association with an element, or a color or shape of a representation of an entity can correspond to the risk variable.

The representation can include, e.g., a graphical or textual representation. As further discussed herein, the representation (and/or presentation) can be interactive, such that the representation dynamically changes based on a reviewer's input. The representation can be presented on a webpage or app page. In one instance, a report or graphic identifies the representation and is sent to (e.g., via email or message) a reviewer.

Figure 5:
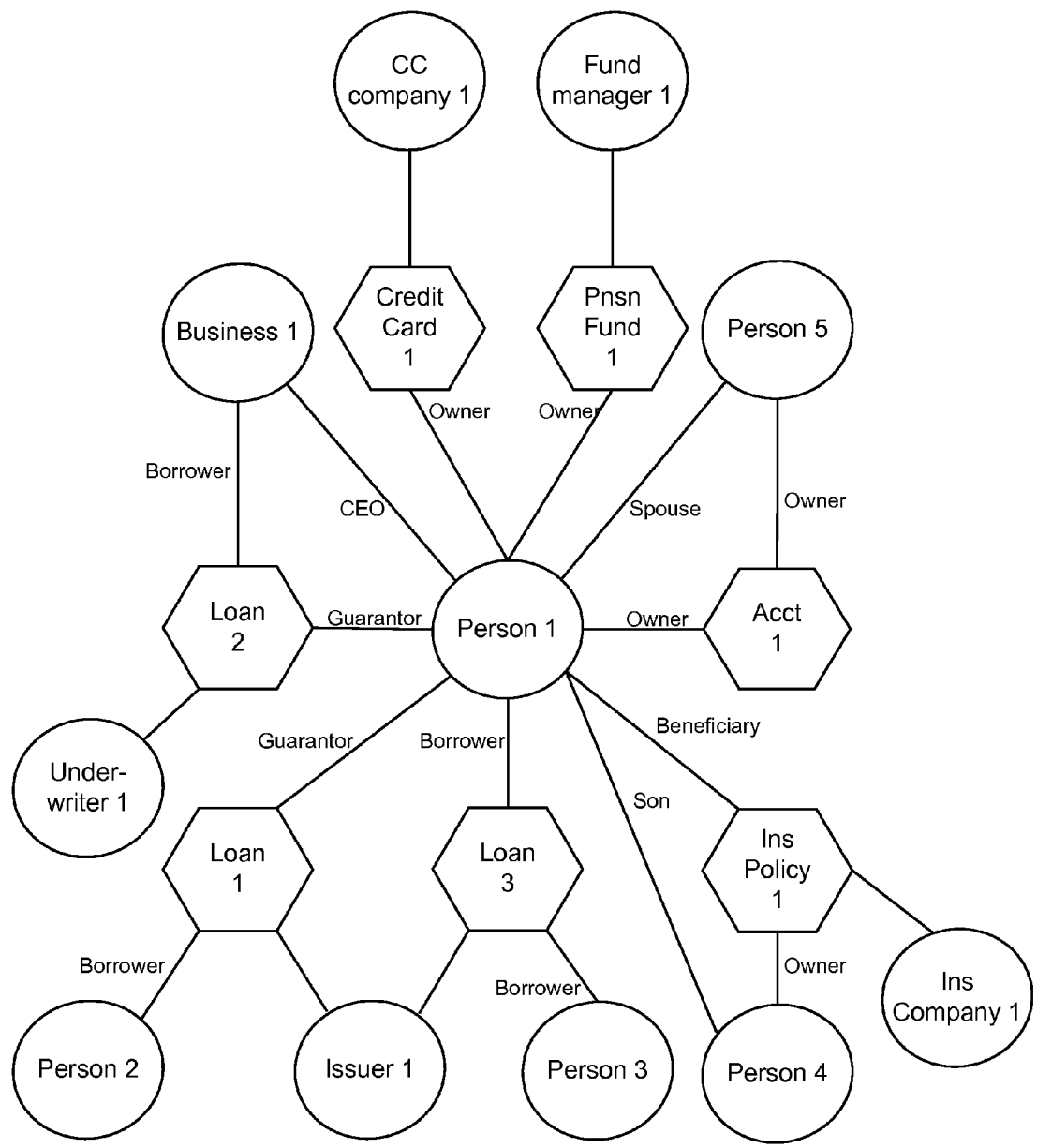
FIG. 5 shows an illustration of a representation of a portion of financial interconnect web.

FIG. 5 shows an illustration of a representation of a portion of financial interconnect web. In this instance, Person 1 is identified as being the first element and is shown as being at a center of a depicted portion of the web. A variety of objects and other entities are shown as being connected to Person 1. Objects are shown in this example as hexagons, and entities are shown in this example as circles. Connections between entities and objects and/or other entities are shown as lines. In this instance, text near each of some depicted lines provides further detail as to a type of relationship.

Person 1 is shown as being a guarantor for Loan 1, which was issued by Issuer 1 to Person 2. Person 1 is also shown as being a guarantor for Loan 2, which was underwritten by Underwriter 1 and issued to Business 1. Documentation associated with Loan 1 may have provided a basis for inferring that Person 1 was also a CEO of Business 1. Person 1 is also shown as being a co-borrower with Person 3 for Loan 3.

In this example, Person 1 is also the beneficiary for Person 4's insurance policy provided by Insurance Company 1. Documentation for the policy may have indicated that Person 1 is Person 4's son.

Person 1 and Person 5 are joint owners of joint checking Account 1. They are also spouses. Finally, Person 1 is associated with a credit card account issued by Credit Card Company 1 and with a pension fund managed by Fund Manager 1. The depicted representation of the web thus provides a picture of Person 1's potential liability and financial position.

Returning to process 400 shown in FIG. 4, a reviewer detail-request input is detected at block 425. The detail-request input can identify an element or connection for which additional detail is requested. The detail-request input can include, for example, selecting (e.g., clicking or tapping on, mousing over, or double clicking) a representation of an object, entity or connection, such as clicking on a hexagon, circle or line shown in FIG. 5.

At block 430, a second element is identified based on the detail-request input. The second element can correspond to one identified in the detail-request input. For example, if a reviewer clicks on a representation of a web element, block 430 can include identifying which element was represented in the area clicked on. As another example, if a reviewer enters text corresponding to an element, block 430 can include mapping the text to an element. The second element can include an entity and/or object and/or (in some instances) a connection.

At block 435, one or more characteristics of the second element are identified. These one or more characteristics can include a characteristic not shown in the representation presented as a result of block 420. The one or more characteristics can include a risk variable and/or pertain to a financial risk or credibility associated with the second element. In some instances, the one or more characteristics include defining information, such as a profession or industry, an age, a status (e.g., marital status or company type), etc.

At block 440, presentation of a characteristic of the one or more characteristics is facilitated. For example, a numeric risk variable can be presented, or a representation of element #2 can be colored to represent a value of a risk variable. As another example, a net worth or net liability can be transmitted to a reviewer device for presentation (e.g., as part of a webpage or app page).

In one instance, a new page or display is presented with the characteristic. For example, a reviewer may be directed to or automatically taken to a second webpage or to a second app page. In one instance, the characteristic is presented concurrently with part or all of a display of the representation of the relationships caused to be presented as a result of block 420. For example, the characteristic may be presented as part of an element representation, in an overlay, or in a pop-up. In one instance, a new report or graphic is generated and is sent to a reviewer.

Figure 6A:
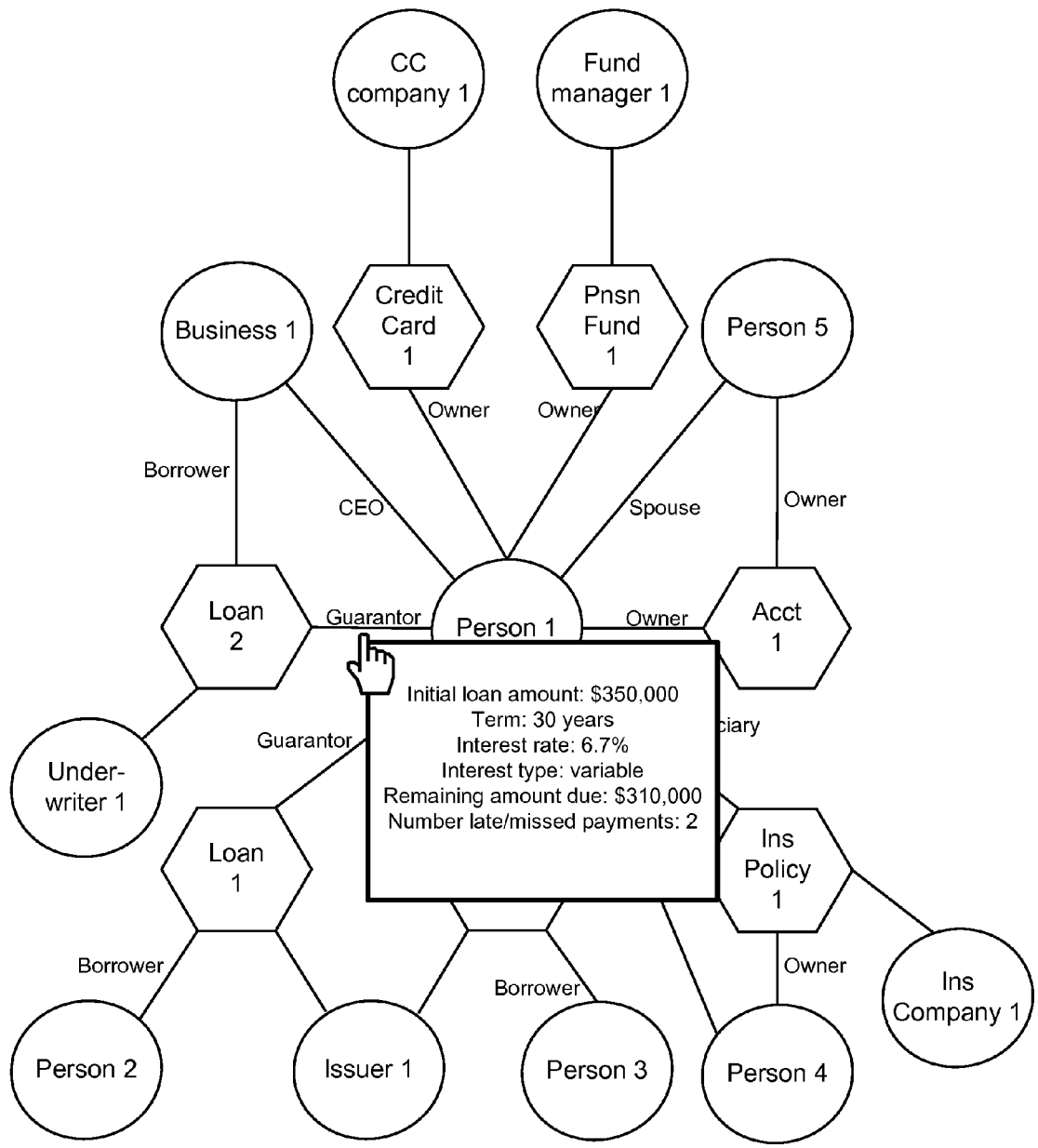
FIGS. 6A-6B show illustrations of a representation of a portion of financial interconnect web with element detail.
Figure 6B:
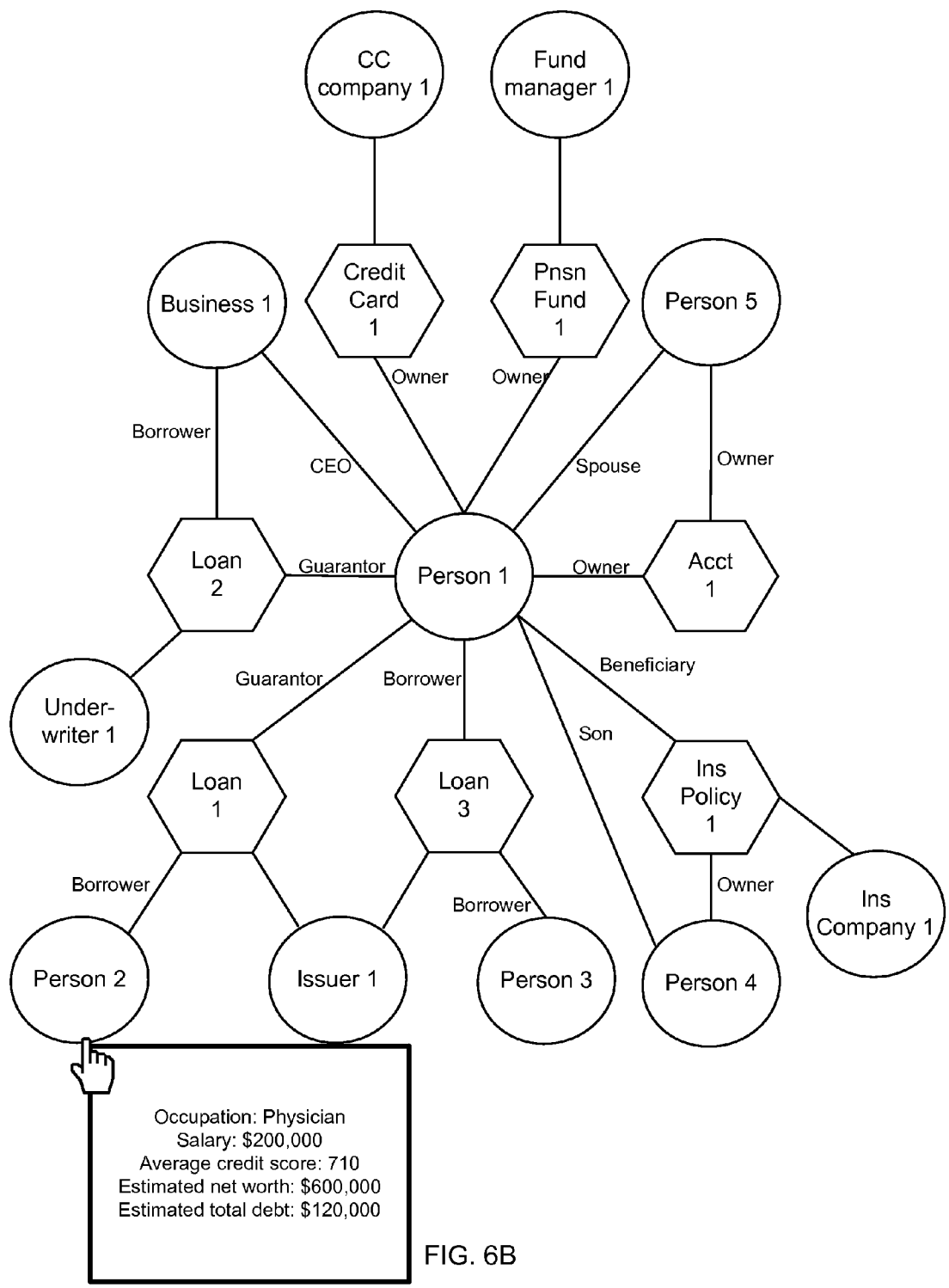

FIGS. 6A-6B show illustrations of a representation of a portion of a financial interconnect web with element detail. FIG. 6A shows an example of a representation shown in response to a reviewer selecting a representation of a connection between Person 1 and Loan 2. The reviewer may have made such a selection after viewing the representation shown in FIG. 5 (which already identified the relationship type).

As shown, the selection can cause details of the loan being guaranteed to be presented. Thus, in this case, the details presented are details about the related element, not about the relationship itself. It will be appreciated that, in some instances, relationship details may alternatively or additionally be presented (e.g., to indicate a relationship type if not already presented).

In the depicted case, the details identify some defining characteristics of Loan 2. The initial loan amount was $350,000, the term was 30 years, and it was for a variable interest rate. The details further include current details, including that a current interest rate is 6.7% and that $310,000 remains due. One current detail is also a historical detail: two payments were either missed or late.

For a reviewer assessing, e.g., a loan application from Person 1, these details can be of great interest. First, it indicates that Person 1 is associated with Loan 2 (and identifies its potential liability). Second, it indicates that Person 1 is not the primary party responsible for Loan 2. Third, the historical payment information provides some indication as to how likely it will be that Person 1 will become primarily responsible for the amount due.

FIG. 6B shows an example of a representation shown in response to a reviewer selecting a representation of Person 2. As shown, Person 1 is serving as a guarantor for Person 2's Loan 1. If a reviewer is evaluating a financial application for Person 1, it may be useful to assess a risk of Person 2 to estimate a likelihood that Person 1 will become responsible for a balance of Loan 1.

In the depicted case, the details indicate that Person 2 is a physician and has a salary of $200,000. Person 2's average credit score is 710. His estimated net worth is $600,000, and his estimated total debt is $120,000. In one instance, these details may be identified based on documentation associated with Loan 1. In one instance, these details may be identified based at least partly on other information. For example, since being approved for Loan 1, Person 2 may have applied for another financial opportunity. This more recent application may be used to identify one or more details. Thus, e.g., if Person 2's net worth increased from the time that he applied for Loan 1, the web may capture at least some of that change.

It will be appreciated that webs can be represented in a variety of manners, and that representations shown in FIGS. 5-6B are merely illustrative. For example, line styles, colors, and/or widths and/or element-representation shadings, colors or sizes may be used to represent features such as: relationship types, financial standings, financial liabilities, entity or object types and/or estimated risk. For example, an algorithm may be used to identify a risk metric for each of one or more elements. The metric can be compared to one or more thresholds, and a color of a representation of each element can be determined based on the threshold comparison (e.g., to show high-risk associations in red, neutral associations in black, and favorable associations in green).

While FIGS. 5-6B show graphical representations of a web, other representations may be used. For example, lists or tables can identify related objects and/or entities. Further, FIGS. 5-6B show representations constrained to objects and entities separate by no more than one object from Party 1. This representation may alternatively be more tightly constrained (e.g., so as not to identify indirect entity relationships, such as the connection between Person 1 and Person 2 via Loan 1) or more loosely constrained (e.g., to show other objects associated with the represented entities).

Further, FIGS. 6A-6B show an initial representation of a web portion being conserved while details are shown. It will be appreciated that, in other embodiments, the representation can be changed or removed altogether. In one instance, when a reviewer selects a web element, the selected element is then treated as the first element. A web representation can then be modified to expand the represented web around the selected element. For example, in FIG. 6B a representation can change such that Person 2 is shown in a center of the representation, and other elements connected to Person 2 are shown. In one instance, a reviewer may be able to drag and drop a representation of a web and/or zoom in and out to modify which relationship details are presented. In some instances, zooming into a representation causes increased connection and/or element detail to be presented.

Figure 7:
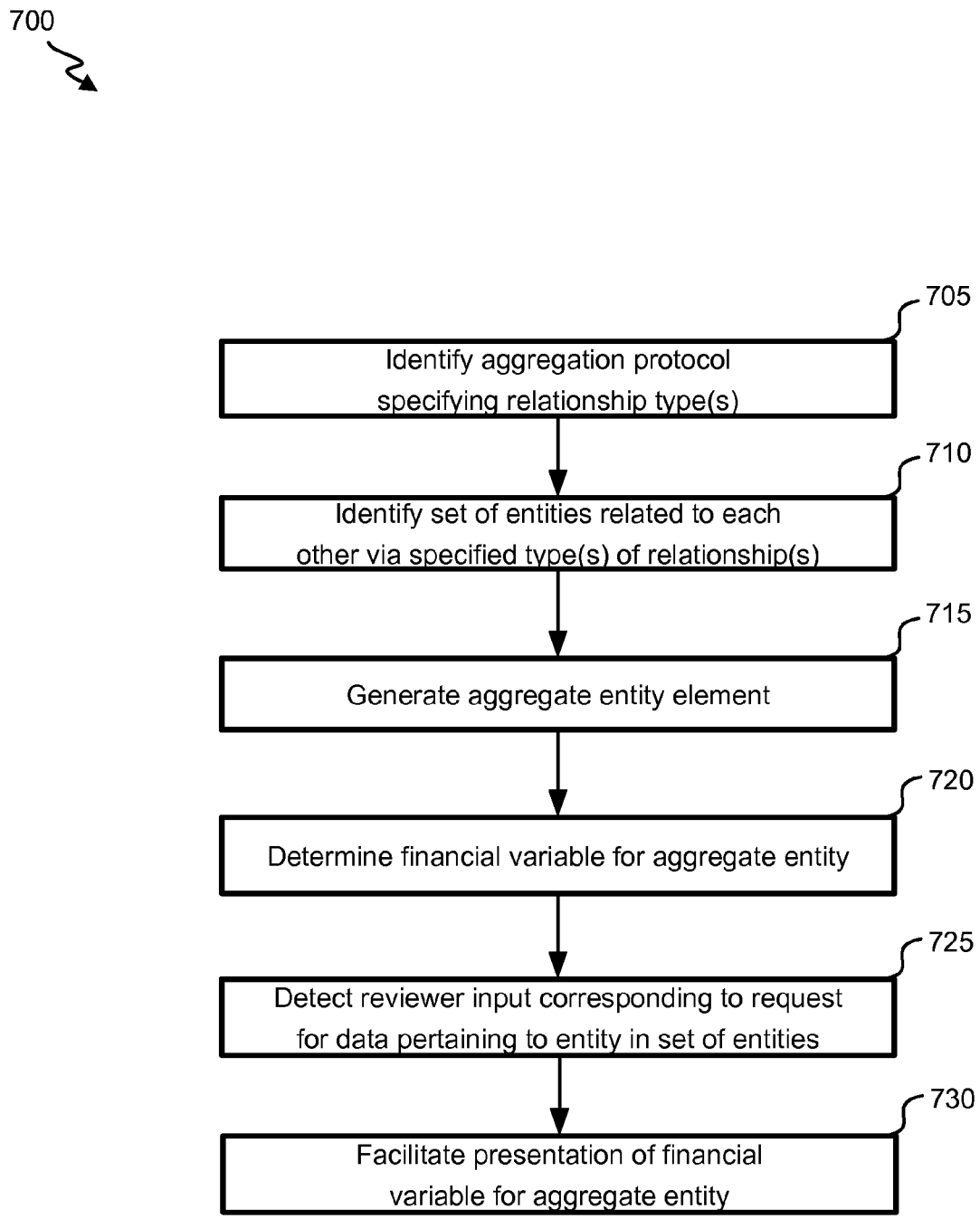
FIG. 7 illustrates a flowchart of an embodiment of a process for defining and using an entity-aggregate element.

FIG. 7 illustrates a flowchart of an embodiment of a process 700 for defining and using an entity-aggregate element. Part or all of process 700 can be performed, for example, at an agent device, reviewer device or in the cloud.

Process 700 begins at block 705 where an aggregation protocol is identified. The aggregation protocol can define conditions under which to generate an aggregate element, which entities are to contribute to an aggregate element, and/or how each entity is to contribute to an aggregate element. In the depicted process, the aggregation protocol indicates which entities are to contribute to an aggregate element by specifying one or more relationship types. The relationship types can include direct or indirect relationships.

For example, a household aggregation protocol may specify that contributing entities for a household aggregate element are to include a first person, any second person related to the first via a spousal relationship and any business owned by either person. The household aggregation protocol may further specify that financial risk of the aggregate entity is to be evaluated based on a summation of liabilities and assets of each contributing entity. As another example, a business aggregation protocol may specify that contributing entities for a business aggregate element are to include the business and all owners. The business aggregation protocol may further specify that financial risk of the aggregate entity is to be evaluated in a manner that weights liabilities and assets of owners in a manner corresponding to their proportional ownership of the business.

An aggregation protocol may be fixed or vary across reviewing institutions, reviewers, contexts (a type of financial service or request being evaluated), and so on. In some instances, an institution agent or reviewer can partly or completely define an aggregation protocol.

At block 710, a set of entities (e.g., and/or corresponding entity elements) that are to contribute to an aggregate entity are identified using the aggregation protocol. Specifically, one or more relationships being of a type specified by the protocol can be identified, and the entities connected to each other via the relationship(s) can be identified to be included in the aggregate entity. For example, for the exemplary household aggregation protocol provided above during discussion of block 705, block 710 can include searching for spousal relationships and business-ownership relationships.

At block 715, an aggregate entity element is generated, which can include (for example) generating a name and/or identifier for the aggregate entity element and/or associating the aggregate entity element with the set of entities (and/or entity elements) identified at block 710. For example, block 715 can include generating a new aggregate entity element that has "Jones Household" name and that is associated with identifiers of two persons (e.g., social security numbers for Mike and Jane Jones). The aggregate entity element can include an element in a web or one independent from a web.

Data for the aggregate entity element can be stored in a data store, such as aggregate entity data store or entity data store. For a given aggregate entity element, stored data can include (for example) a name, an identifier of each of a set of entities to contribute to the aggregate entity and/or a weight of a contribution for each entity in the set of entities.

At block 720, a financial variable is determined for the aggregate entity. The financial variable can relate to and/or reflect, for example, an estimated risk, liability (e.g., net liability), net worth and/or asset valuation. The variable can be determined, for example, based on corresponding data associated with the set of entities. For example, a risk variable for the aggregate entity may be defined as a weighted average of risk variables for entities in the set of entities. As another example, a liability variable for the aggregate entity may be defined as a sum of liability variables for entities in the set of entities. A formula for determining the financial variable may be, for example, defined within the aggregation protocol.

At block 725, reviewer input corresponding to a request for data pertaining to an entity in a set of entities is detected. The input can include, for example, entry of an identifier of a person, organization or business (e.g., a name or social security number), clicking on a representation of person or organization or business in a financial web representation. In some instances, block 725 can include detecting an input corresponding to a request to provide an analysis of a request from the entity for a financial service. For example, a loan officer may request a risk variable for a loan requested by a particular person.

Upon detecting the reviewer input, it can be determined that the entity corresponding to the input is associated with the aggregate entity element generated at block 715. Then, at block 730, a presentation of the financial variable for the aggregate entity can be facilitated. For example, a risk score for a household aggregate element can be presented. The financial variable can be presented, for example, within a representation of a financial web (e.g., which can include a representation of the aggregate entity element), within a report, as part of a webpage or app page and/or within an email message.

Figure 8:
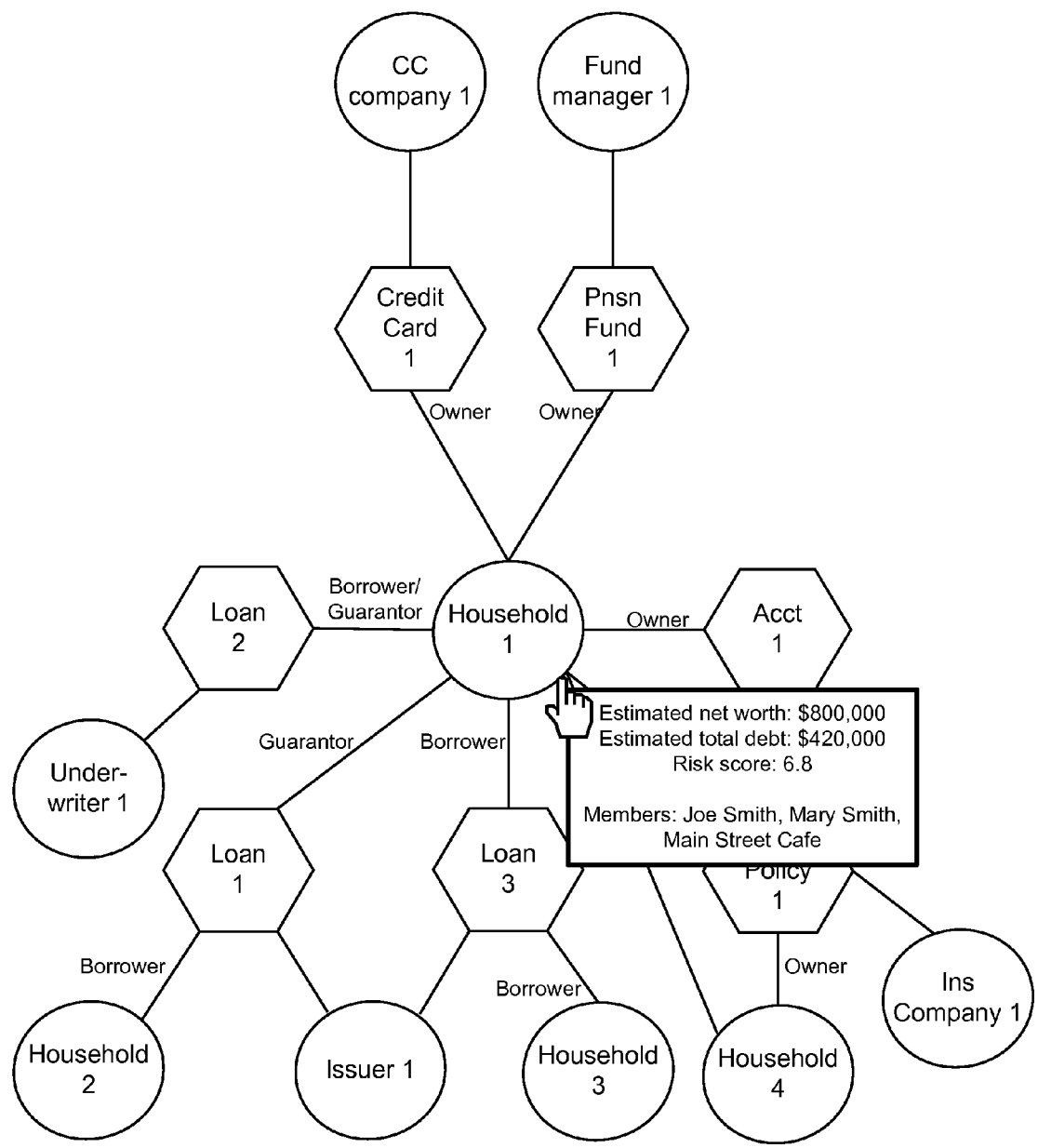
FIG. 8 shows an illustration of a representation of a portion of financial interconnect web that reflects aggregate entity representations.

FIG. 8 shows an illustration of a representation of a portion of financial interconnect web that reflects aggregate entity representations. The depicted representation includes similar relationships to those shown in FIG. 5, though here, representations of individuals and businesses are replaced by representations of households. For example, Persons 1 and 5 are replaced with Household 1. In this instance, Business 1 further contributes to Household 1. Further shown are details for Household 1 that reflects net worth and debt across contributing entities and a risk score influenced based on data of contributing entities. The details further identify the contributing members.

An aggregate representation and/or variables can encourage a reviewer to consider risk not based on solely financial factors of a particular person or business in consideration but also based on financial factors of other entities sufficiently closely related to the person or business to be pertinent to the evaluation.

The financial variable presented as a result of block 730 can be presented instead of, or in addition to, one or more financial variables for the entity. The presentation can include an identification of one, more or all entities in the set of entities. In some instances, the presentation can include an option to adjust which entities are to contribute to the aggregate entity.

In some instances, in addition to or instead of facilitating a presentation of the financial variable for the aggregate entity, the financial variable for the aggregate entity is used. For example, the aggregate-entity financial variable can be used to generate a score for a loan request. The loan request score may depend on one or more other variables, such as a requested amount, proposed down payment, financial variable for a guarantor and/or a loan type. Use of the aggregate-entity financial variable can be performed in a manner to avoid or reduce a degree of include repeated influences of same data. For example, if a loan applicant has outstanding debts totaling $50,000, and a household entity for the loan applicant (corresponding to the applicant and a spouse) have outstanding debts totaling $100,000, consideration of the $100,000 debt total itself reflects the applicant's $50,000 debt, and they need not be separately considered during evaluation of a loan. As another example, one technique for evaluating a loan request may include summing a number of risk points associated with various aspects of the request (e.g., an amount, riskiness of a guarantor, purpose and riskiness of a household associated with the applicant). If the household entity risk points are included in the total, risk points associated with the individual loan applicant need not be separately included in the sum.

It will be appreciated that financial variables associated with aggregate entity elements can be repeatedly updated (e.g., in real-time) based on any changes corresponding to contributing entities. For example, if a business co-owner takes out a new personal loan, a risk variable for an aggregate business entity element may automatically be adjusted to reflect increased risk.

Figure 9:
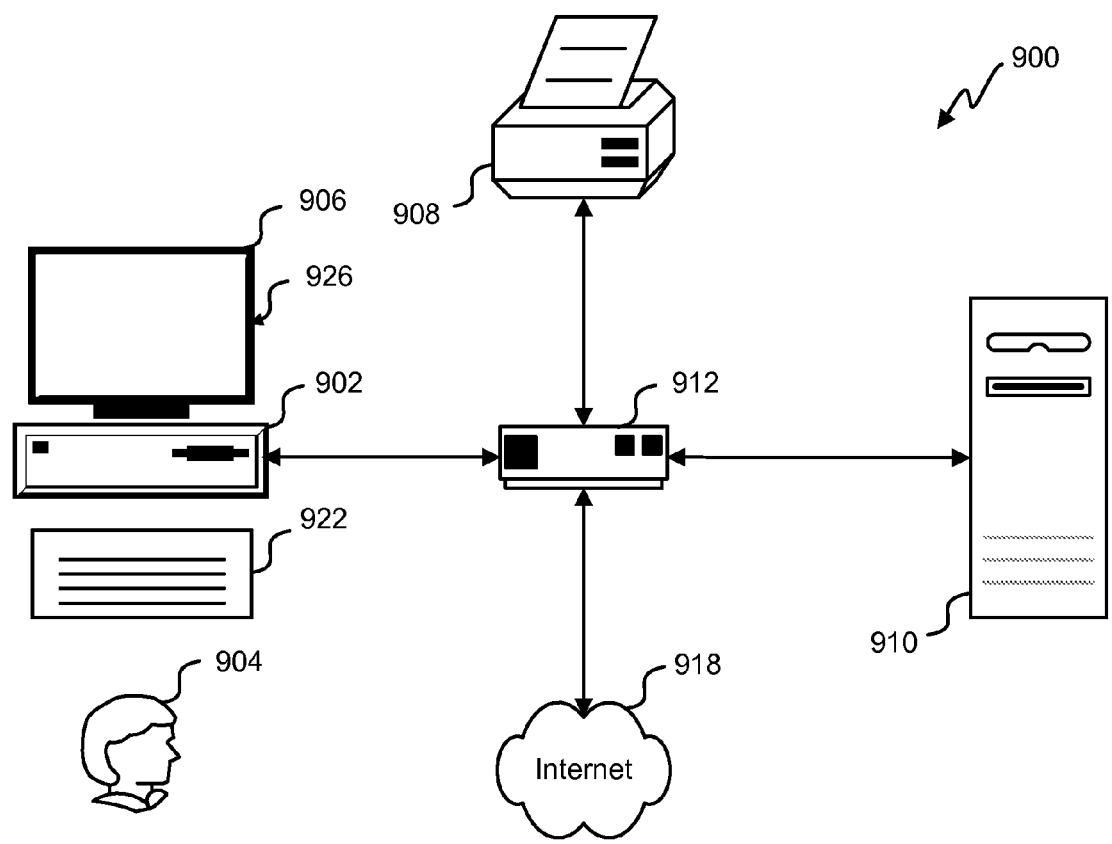
FIG. 9 depicts a block diagram of an embodiment of a computer system.

Referring next to FIG. 9, an exemplary environment with which embodiments can be implemented is shown with a computer system 900 that can be used by a designer 904 to design, for example, electronic designs. The computer system 900 can include a computer 902, keyboard 922, a network router 912, a printer 908, and a monitor 906. The monitor 906, processor 902 and keyboard 922 are part of a computer system 926, which can be a laptop computer, desktop computer, handheld computer, mainframe computer, etc. Monitor 906 can be a CRT, flat screen, etc.

A designer 904 can input commands into computer 902 using various input devices, such as a mouse, keyboard 922, track ball, touch screen, etc. If the computer system 900 comprises a mainframe, a designer 904 can access computer 902 using, for example, a terminal or terminal interface. Additionally, computer system 926 can be connected to a printer 908 and a server 910 using a network router 912, which can connect to the Internet 918 or a WAN.

Server 910 can, for example, be used to store additional software programs and data. In one embodiment, software implementing the systems and methods described herein can be stored on a storage medium in server 910. Thus, the software can be run from the storage medium in server 910. In another embodiment, software implementing the systems and methods described herein can be stored on a storage medium in computer 902. Thus, the software can be run from the storage medium in computer system 926. Therefore, in this embodiment, the software can be used whether or not computer 902 is connected to network router 912. Printer 908 can be connected directly to computer 902, in which case, computer system 926 can print whether or not it is connected to network router 912.

Figure 10:
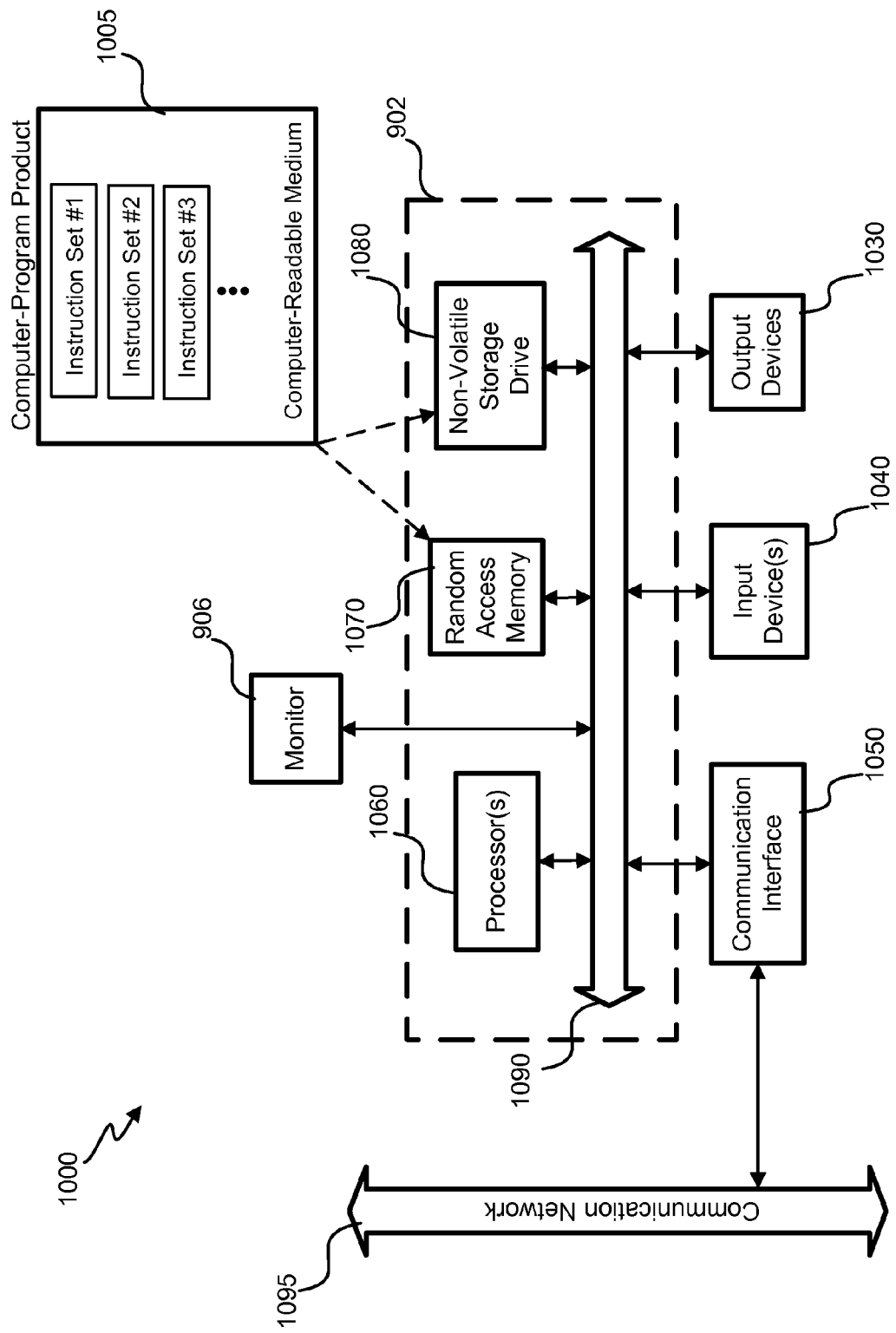
FIG. 10 depicts a block diagram of an embodiment of a special-purpose computer system.

With reference to FIG. 10, an embodiment of a special-purpose computer system 1000 is shown. A computing system configured to perform part or all flowcharts or methods described herein (or combinations thereof) are examples of a special-purpose computer system 1000. Thus, for example, one or more special-purpose computer systems 1000 can be used to provide the function of financial-web management system 150. The above methods can be implemented by computer-program products that direct a computer system to perform the actions of the above-described methods and components. Each such computer-program product can comprise sets of instructions (codes) embodied on a computer-readable medium that directs the processor of a computer system to perform corresponding actions. The instructions can be configured to run in sequential order, or in parallel (such as under different processing threads), or in a combination thereof. After loading the computer-program products on a general purpose computer system 926, it is transformed into the special-purpose computer system 1000.

Special-purpose computer system 1000 comprises a computer 902, a monitor 906 coupled to computer 902, one or more additional entity output devices 1030 (optional) coupled to computer 902, one or more entity input devices 1040 (e.g., keyboard, mouse, track ball, touch screen) coupled to computer 902, an optional communications interface 1050 coupled to computer 902, a computer-program product 1005 stored in a tangible computer-readable memory in computer 902. Computer-program product 1005 directs system 1000 to perform the above-described methods. Computer 902 can include one or more processors 1060 that communicate with a number of peripheral devices via a bus subsystem 1090. These peripheral devices can include entity output device(s) 1030, entity input device(s) 1040, communications interface 1050, and a storage subsystem, such as random access memory (RAM) 1070 and non-volatile storage drive 1080 (e.g., disk drive, optical drive, solid state drive), which are forms of tangible computer-readable memory.

Computer-program product 1005 can be stored in non-volatile storage drive 1090 or another computer-readable medium accessible to computer 902 and loaded into memory 1070. Each processor 1060 can comprise a microprocessor, such as a microprocessor from Intel® or Advanced Micro Devices, Inc®, or the like. To support computer-program product 1005, the computer 902 runs an operating system that handles the communications of product 1005 with the above-noted components, as well as the communications between the above-noted components in support of the computer-program product 1005. Exemplary operating systems include Windows® or the like from Microsoft Corporation, Solaris® from Sun Microsystems, LINUX, UNIX, and the like.

Entity input devices 1040 include all possible types of devices and mechanisms to input information to computer system 902. These can include a keyboard, a keypad, a mouse, a scanner, a digital drawing pad, a touch screen incorporated into the display, audio input devices such as voice recognition systems, microphones, and other types of input devices. In various embodiments, entity input devices 1040 are typically embodied as a computer mouse, a trackball, a track pad, a joystick, wireless remote, a drawing tablet, a voice command system. Entity input devices 1040 typically allow an entity to select objects, icons, text and the like that appear on the monitor 906 via a command such as a click of a button or the like. Entity output devices 1030 include all possible types of devices and mechanisms to output information from computer 902. These can include a display (e.g., monitor 906), printers, non-visual displays such as audio output devices, etc.

Communications interface 1050 provides an interface to other communication networks and devices and can serve as an interface to receive data from and transmit data to other systems, WANs and/or the Internet 918. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1050 can be coupled to a computer network, to a FireWire® bus, or the like. In other embodiments, communications interface 1050 can be physically integrated on the motherboard of computer 902, and/or can be a software program, or the like.

RAM 1070 and non-volatile storage drive 1080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1070 and non-volatile storage drive 1080 can be configured to store the basic programming and data constructs that provide the functionality of various embodiments of the present invention, as described above.

Software instruction sets that provide the functionality of the present invention can be stored in RAM 1070 and non-volatile storage drive 1080. These instruction sets or code can be executed by processor(s) 1060. RAM 1070 and non-volatile storage drive 1080 can also provide a repository to store data and data structures used in accordance with the present invention. RAM 1070 and non-volatile storage drive 1080 can include a number of memories including a main random access memory (RAM) to store of instructions and data during program execution and a read-only memory (ROM) in which fixed instructions are stored. RAM 1070 and non-volatile storage drive 1080 can include a file storage subsystem providing persistent (non-volatile) storage of program and/or data files. RAM 1070 and non-volatile storage drive 1080 can also include removable storage systems, such as removable flash memory.

Bus subsystem 1090 provides a mechanism to allow the various components and subsystems of computer 902 communicate with each other as intended. Although bus subsystem 1090 is shown schematically as a single bus, alternative embodiments of the bus subsystem can utilize multiple busses or communication paths within computer 902.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments. It will also be appreciated that disclosures herein can further relate to details in U.S. Application No. 62/032,239, filed on Aug. 1, 2014, which is hereby incorporated by reference in its entirety for all purposes.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A computer system for detecting interrelationships between entities and financial objects, the system comprising:
    a financial object monitoring engine that accesses information pertaining to each of a set of financial objects, each of a first financial object and a second financial object including a loan or a loan request;
    an entity detecting engine that includes one or more processors and that:
        identifies, for the first financial object and based on the accessed information pertaining to the first financial object, that a first entity is a loan applicant, borrower or guarantor for the first financial object; and
        identifies, for the second financial object and based on the accessed information pertaining to the second financial object, that a second entity is a borrower for the second financial object;
    a relationship detecting engine that determines, based on an electronic record pertaining to the second financial object, that the first entity and the second entity are related via an occupational relationship or a familial relationship;
    a web management engine that:
    generates a multi-party interrelationship web that includes:
        an identification of each financial object in the set of financial objects;
        an identification, for each financial object in the set of financial objects, of each of the one or more entities having a relationship to the financial object; and
        an identification, for each financial object in the set of financial objects, of the relationship between each of the one or more entities and the financial object;
    a risk assessment engine that:
        determines a financial variable for the second entity, the financial variable being related to at least one of an estimated risk, a net liability, a net worth and an asset valuation;
        detects, based on existence of the occupational relationship or familial relationship, that a risk score for the first entity is to be determined based on the financial variable for the second entity; and
        determines the risk score for the first entity that represents a financial risk for the first entity based on the financial variable for the second entity;
    a reviewer interface manipulation engine that:
        receives a query input corresponding to an identification of the query-identified first entity; and
        facilitates a presentation of the multi-party interrelationship web that includes an indication that the first entity and the second entity are related via the occupational relationship or the familial relationship and an indication of the risk score of the first entity.

2. The system for detecting interrelationships between entities and financial objects as recited in claim 1, wherein the generating the multi-party interrelationship web includes updating a stored version of the multi-party interrelationship web.

3. The system for detecting interrelationships between entities and financial objects as recited in claim 1, wherein the reviewer interface manipulation engine further facilitates a presentation of the financial variable corresponding to the second entity.

4. The system for detecting interrelationships between entities and financial objects as recited in claim 1, wherein the facilitating the presentation of the indication that the first entity and the second entity are related via the occupational relationship or the familial relationship includes facilitating a presentation of a graphical representation of at least part of the multi-party interrelationship web, and wherein the graphical representation includes a graphical representation of each of the first entity, the second entity and the one or more financial objects.

5. The system for detecting interrelationships between entities and financial objects as recited in claim 4, wherein the reviewer interface manipulation engine further:
    receives a second input corresponding to an identification of an element in the at least part of the multi-party interrelationship web; and
    facilitates a modification of a graphical representation of the at least part of the multi-party interrelationship web such that additional detail pertaining to the identified element is shown.

6. The system for detecting interrelationships between entities and financial objects as recited in claim 1, wherein the second entity is not directly related to the first financial object.

7. The system for detecting interrelationships between entities and financial objects as recited in claim 1, wherein the relationship detecting engine uses data pertaining to another financial object in the set of financial objects to identify a second occupational or familial relationship between the first entity and a third entity,
    wherein the presentation further identifies the third entity and the business or familial relationship.

8. A computer-implemented method for detecting interrelationships between entities and financial objects, the method comprising:
    accessing, using at least one processor device, information pertaining to each of a set of financial objects, at least one of the financial objects including a loan or loan request;
    identifying, based on the accessed information and for each financial object in the set of financial objects, one or more entities having a relationship to the financial object, at least one of the one or more entities having an actual or potential financial responsibility as a result of the relationship, and at least one entity having a relationship to multiple financial objects in the set of financial objects;

generating a multi-party interrelationship web that includes:
- an identification of each financial object in the set of financial objects;
- an identification, for each financial object in the set of financial objects, of each of the one or more entities having a relationship to the financial object; and
- an identification, for each financial object in the set of financial objects, of the relationship between each of the one or more entities and the financial object;
- an identification of a financial variable for each entity of the one or more entities having a relationship to the financial object, the financial variable being related to at least one of an estimated risk, a net liability, a net worth and an asset valuation;

receiving a query input corresponding to an identification of a first entity;

identifying, using the multi-party interrelationship web, a second entity related to the first entity via one or more financial objects in the set of financial objects, the second entity also being related to the first entity via an occupational relationship or a familial relationship;

assessing a risk score of the first entity based on the financial variable for the second entity and a relationship between the second entity and the first entity; and facilitating a presentation of an indication that the first entity and the second entity are related via the one or more financial objects and the assessed risk score.

9. The computer-implemented method for detecting interrelationships between entities and financial objects as recited in claim 8, wherein the generating the multi-party interrelationship web includes updating a stored version of the multi-party interrelationship web.

10. The computer-implemented method for detecting interrelationships between entities and financial objects as recited in claim 8, further comprising facilitating a presentation of a financial variable corresponding to the second entity that is based on an outstanding financial liability of the second entity.

11. The computer-implemented method for detecting interrelationships between entities and financial objects as recited in claim 8, wherein the facilitating the presentation of the indication that the first entity and the second entity are related via the one or more financial objects includes facilitating a presentation of a graphical representation of at least part of the multi-party interrelationship web, and wherein the graphical representation includes a graphical representation of each of the first entity, the second entity and the one or more financial objects.

12. The computer-implemented method for detecting interrelationships between entities and financial objects as recited in claim 11, further comprising:
receiving a second input corresponding to an identification of an element in the at least part of the interrelationship web; and
facilitating a modification of a graphical representation of the at least part of the multi-party interrelationship web such that additional detail pertaining to the identified element is shown.

13. The computer-implemented method for detecting interrelationships between entities and financial objects as recited in claim 8, wherein the second entity is a guarantor corresponding to a loan request for which the first entity is an applicant.

14. The computer-implemented method for detecting interrelationships between entities and financial objects as recited in claim 8, further comprising:
using data pertaining to another financial object in the set of financial objects to identify a business or familial relationship between the first entity and a third entity,
wherein the presentation further identifies the third entity and the business or familial relationship.

15. A computer-program product tangibly embodied in a non-transitory machine-readable storage medium, including instructions configured to cause one or more data processors to perform operations including:
accessing information pertaining to each of a set of financial objects, at least one of the financial objects including a loan or loan request;

identifying, based on the accessed information and for each financial object in the set of financial objects, one or more entities having a relationship to the financial object, at least one of the one or more entities having an actual or potential financial responsibility as a result of the relationship, and at least one entity having a relationship to multiple financial objects in the set of financial objects;

generating a multi-party interrelationship web that includes:
- an identification of each financial object in the set of financial objects;
- an identification, for each financial object in the set of financial objects, of each of the one or more entities having a relationship to the financial object; and
- an identification, for each financial object in the set of financial objects, of the relationship between each of the one or more entities and the financial object;
- an identification of a financial variable for each entity of the one or more entities having a relationship to the financial object, the financial variable being related to at least one of an estimated risk, a net liability, a net worth and an asset valuation;

receiving a query input corresponding to an identification of a first entity;

identifying, using the multi-party interrelationship web, a second entity related to the first entity via one or more financial objects in the set of financial objects, the second entity also being related to the first entity via an occupational relationship or a familial relationship;

assessing a risk score of the first entity based on the identified financial variable for the second entity and the way in which the second entity is related to the first entity; and facilitating a presentation of an indication that the first entity and the second entity are related via the one or more financial objects and the assessed risk score.

16. The computer-program product as recited in claim 15, wherein the generating the multi-party interrelationship web includes updating a stored version of the multi-party interrelationship web.

17. The computer-program product as recited in claim 15, wherein the operations further include facilitating a presentation of a financial variable corresponding to the second entity that is based on an outstanding financial liability of the second entity.

18. The computer-program product as recited in claim 15, wherein the facilitating the presentation of the indication that the first entity and the second entity are related via the one or more financial objects includes facilitating a presentation of a graphical representation of at least part of the multi-party interrelationship web, and wherein the graphical representation includes a graphical representation of each of the first entity, the second entity and the one or more financial objects.

19. The computer-program product as recited in claim 18, wherein the operations further include:
- receiving a second input corresponding to an identification of an element in the at least part of the interrelationship web; and
- facilitating a modification of a graphical representation of the at least part of the multi-party interrelationship web such that additional detail pertaining to the identified element is shown.

20. The computer-program product as recited in claim 15, wherein the second entity is a guarantor corresponding to a loan request for which the first entity is an applicant.

* * * * *